United States Patent [19]
Mita et al.

[11] Patent Number: 5,493,415
[45] Date of Patent: Feb. 20, 1996

[54] IMGAE PROCESSING SYSTEM

[75] Inventors: Yoshinobu Mita; Yoshihiro Ishida, both of Kawasaki; Miyuki Enokida, Yokohama; Junichi Shishizuka, Tokyo, all of Japan

[73] Assignee: Canon Kabushiki Kaisha, Tokyo, Japan

[21] Appl. No.: 162,798

[22] Filed: Dec. 7, 1993

Related U.S. Application Data

[63] Continuation of Ser. No. 84,452, Jul. 1, 1993, abandoned, which is a continuation of Ser. No. 513,963, Apr. 24, 1990, abandoned.

[30]  Foreign Application Priority Data

Apr. 27, 1989 [JP] Japan ................................. 1-111017
Apr. 27, 1989 [JP] Japan ................................. 1-111018
Apr. 27, 1989 [JP] Japan ................................. 1-111019
Apr. 28, 1989 [JP] Japan ................................. 1-109520

[51] Int. Cl.⁶ .................................................... H04N 1/40
[52] U.S. Cl. ........................... 358/444; 358/468; 382/162
[58] Field of Search .................... 382/17, 41, 49, 382/62; 358/442, 444, 451, 468, 501, 505, 515, 524, 527; 395/162, 164; 345/186, 187, 188

[56]  References Cited

U.S. PATENT DOCUMENTS

| | | | |
|---|---|---|---|
| 4,338,636 | 7/1982 | Yamada et al. | 358/452 |
| 4,500,919 | 2/1985 | Schreiber | 358/78 |
| 4,617,596 | 10/1986 | Yoshida et al. | 358/451 |
| 4,639,771 | 1/1987 | Hattori et al. | 358/80 |
| 4,727,435 | 2/1988 | Otami et al. | 358/468 |
| 4,760,458 | 7/1988 | Watanabe et al. | 358/452 |
| 4,760,463 | 7/1988 | Nonoyama et al. | 358/280 |
| 4,789,900 | 12/1988 | Takahashi | 358/257 |
| 4,797,748 | 1/1989 | Kotani et al. | 358/257 |
| 4,797,943 | 1/1989 | Murayama et al. | 382/50 |
| 4,814,893 | 3/1989 | Katoh | 358/295 |
| 4,837,635 | 6/1989 | Santos | 358/287 |
| 4,893,258 | 1/1990 | Sakuragi | 358/451 |
| 4,897,735 | 1/1990 | Onada | 358/449 |
| 4,942,479 | 7/1990 | Kanno | 358/451 |
| 4,958,237 | 9/1990 | Kubota | 358/77 |
| 5,001,574 | 3/1991 | Shimizu et al. | 358/448 |
| 5,191,647 | 3/1993 | Masaki | 395/162 |

FOREIGN PATENT DOCUMENTS

| | | | |
|---|---|---|---|
| 051294 | 5/1982 | European Pat. Off. | H04N 1/00 |
| 175385 | 3/1986 | European Pat. Off. | H04N 1/32 |
| 177640 | 4/1986 | European Pat. Off. | G06F 15/62 |
| 269746 | 6/1988 | European Pat. Off. | H04N 1/00 |
| 309196 | 3/1989 | European Pat. Off. | H04N 1/387 |
| 58-97963 | 6/1983 | Japan | H04N 1/38 |
| 58-104567 | 6/1983 | Japan | H04N 1/38 |
| 59-104855 | 6/1984 | Japan | H04N 1/00 |
| 2082014 | 2/1982 | United Kingdom | H04N 1/40 |
| 2089165 | 6/1982 | United Kingdom | H04N 1/40 |
| 2172464 | 9/1986 | United Kingdom | H04N 1/41 |

OTHER PUBLICATIONS

Hamacher et al "Computer Organization", 2nd Edition Morgan Hill Book Co. 1987, pp. 176–179.
Mano "Computer System Architecture" Prentice Hall Inc. 1982 pp. 428–429.

*Primary Examiner*—Joseph Mancuso
*Attorney, Agent, or Firm*—Fitzpatrick, Cella, Harper & Scinto

[57]  ABSTRACT

An image processing system for use in a copying machine or a facsimile machine includes an original-image reading device which allows an operator to check the state of a read image before the read image is printed out or transmitted. The original image read by a reading section is temporarily stored in a recording section. Image data on the stored image is accessed and displayed on a display screen at high speed under direct memory access control.

50 Claims, 24 Drawing Sheets

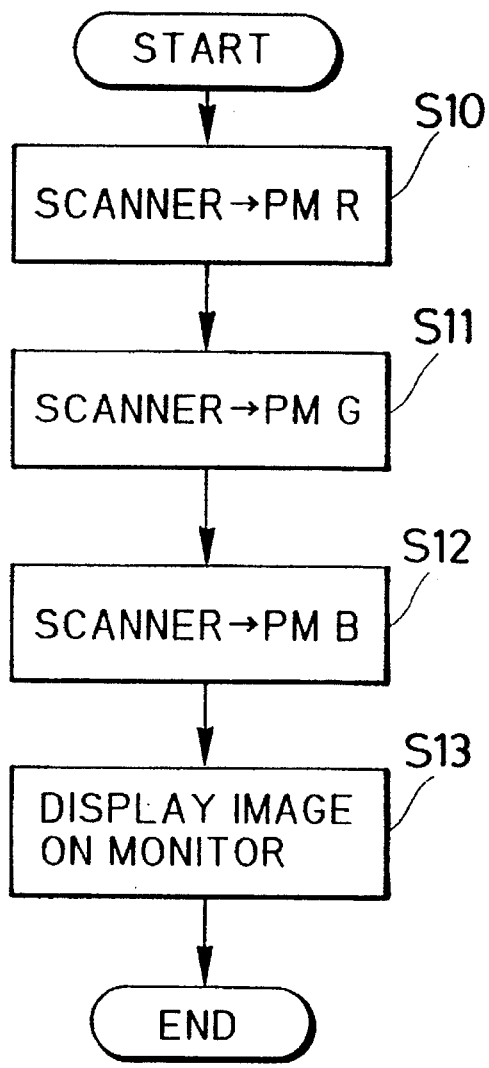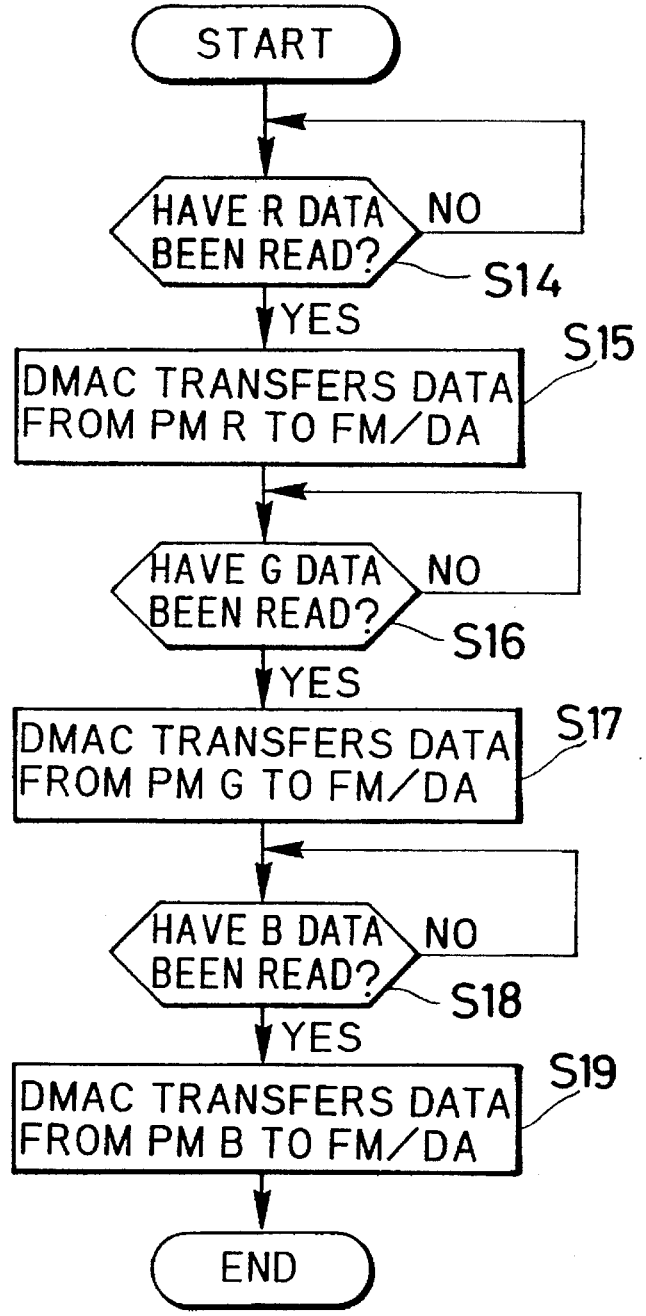
Fig. 8A
Fig. 8B

| | SELECT SIGNAL | | SELECTOR OUTPUT SIGNAL | | |
|---|---|---|---|---|---|
| | S1 | S2 | L1 | L2 | L3 |
| DURING TRANSFER OF R DATA BY DMAC | 0 | 0 | DR | DR | DR |
| DURING TRANSFER OF G DATA BY DMAC | 0 | 1 | DG | DG | DG |
| DURING TRANSFER OF B DATA BY DMAC | 1 | 0 | DB | DB | DB |

Fig. 15

IMGAE PROCESSING SYSTEM

This application is a continuation of application Ser. No. 08/084,452 filed Jul. 1, 1993, which was a continuation application of Ser. No. 07/513,963, filed Apr. 24, 1990, both now abandoned.

BACKGROUND OF THE INVENTION

The present invention relates to an image processing system having the function of producing a printout from a read image.

A copying machine, a facsimile machine and the like are known as typical examples of an apparatus having such a function. This kind of apparatus has been generally arranged to produce a printout directly from a read image.

In the case of such an arrangement, most operators can not get to know whether reading of images has succeed or not until they actually view printouts.

If it is desired to add particular data (e.g., a character string) to a read image for the purpose of an easy understanding or utilization of the information carried by the image, there is no choice but to process the printout of the image and operators are compelled to do extremely time-consuming work. For example, it may be necessary to add the particular information (e.g.,a message) to the printout of an original image without altering the original image. In this case, however, an operator needs to produce a copy of the original image, manually write the desired information or the like on the copy to prepare a new original, and again produce a copy therefrom.

A number of other problems are pointed out. For example, in color image communication systems (including facsimiles for monochrome image communications), it is impossible to transmit or receive an image while monitoring it. As a result, on the transmission side, it is impossible to easily and quickly check whether an image to be transmitted has been correctly read.

On the reception side, since it is impossible to determine whether a received image contains errors or defects until the image is actually printed out, the failure of image reception cannot be promptly detected.

Conventional communication systems of this kind has further problems. For example, the size of an image which is to be outputted at a destination system cannot be specified on the transmission side. Similarly, a received image cannot be printed out on an arbitrarily enlarged or reduced scale on the reception side.

In addition, since image information generally contains a huge amount of information, it takes a long time to alter the size or color tone of an image represented by readout image data by means of a microprocessor which controls the apparatus.

SUMMARY OF THE INVENTION

It is therefore an object of the present invention to provide an image processing system capable of displaying a readout image on a display screen for confirmation purposes before producing a printout of the image.

To achieve this object, according to the present invention, there is provided an image processing system arranged to read an original image and produce an image output on a recording medium, which is provided with reading means for reading the original image, memory means for storing image information read by the reading means, direct memory access means for transferring data at high speed, processing means for processing the image information, display means for displaying an image, and control means for providing control to cause the direct memory access means to access the image information stored in the memory means, cause the processing means to process the image information, and display the image information on the display means.

It is another object of the present invention to provide an image processing system which is capable of quickly displaying a readout image on a display screen for confirmation purposes and which enables an operator to arbitrarily add the result derived from the processing of a displayed image to an image to be printed out.

To achieve this object, according to the present invention, there is provided an image processing system arranged to read an original image and produce an image output on a recording medium, which is provided with reading means for reading the original image, memory means for storing image information read by the reading means, display means for displaying the image information, output means for outputting the image information to the recording medium, direct memory access means for transferring data at high speed, processing means for processing the image information, first control means for providing control to cause the direct memory access means to access the image information stored in the memory means, cause the processing means to process the image information, and display the image information on the display means, and second control means for controlling the output means under the control of the first control means.

It is another object of the present invention to provide an image processing system which makes it possible to quickly determine whether an original image has been correctly read.

To achieve this object, according to the present invention, there is provided an image processing system arranged to read an original image and produce an image output on a recording medium, which is provided with reading means for sequentially reading out the original image as frame images for individual color components, memory means for storing the individual frame images read by the reading means, direct memory access means for transferring data at high speed, display means for displaying an image, and control means for providing control to cause the direct memory access means to access the image information stored in the memory means sequentially and cause the display means to display the image which is synthesized in a frame-sequential manner.

It is a further object of the present invention to provide an image processing system capable of processing an image read through a scanner at high speed and storing it in memory, and of outputting the image stored in the memory to a printer at high speed.

To achieve this object, according to the present invention, there is provided an image processing system in which an image memory, a direct memory access controller, an interface for communicating data with a scanner or a printer, and a display image memory are connected by a bus. In the image process system, the interface is provided with pipeline processing means for subjecting image data to pipeline processing including predetermined processings such as color conversion and magnification alteration.

It is another object of the present invention to provide an image processing system capable of reading an original image while displaying it.

To achieve this object, according to the present invention, there is provided an image processing system arranged to read an original image and produce an image output on a recording medium, which is provided with reading means for reading out the original image, memory means for storing image data, a first bus for connecting the reading means and memory means, writing means for writing the image data read by the reading means to the memory means over the first bus, display means for displaying an image, a second bus for connecting the display means and the memory means, direct memory access means provided at a position along the second bus, and, controlling means for controlling the direct memory access means, while the writing means is writing the read image data to the memory means, to cause the direct memory access means to transfer the image data written by the writing means to the display means.

It is another object of the present invention to provide an image processing system which enables an operator to easily check which part of an original image is to be transmitted before it is transmitted to a destination system.

To achieve this object, according to the present invention, there is provided an image processing system having image communication means capable of transmitting image information to a destination apparatus, which system is provided with reading means for reading out an original image, memory means for storing image information read by the reading means, display means for displaying an image on a display screen, first control means arranged to alter the size of an image carried by the image information stored in the memory means according to the size of the original image and output the image of altered size to the display means, second control means for displaying a desired portion of a reference image at a desired magnification, the reference image being an image displayed under the control of the first control means, and transmitting means arranged to alter the size of the image carried by the image information stored in the memory means at the magnification controlled by the second control means and transmit the image information on the image of altered size to the destination apparatus.

It is another object of the present invention to provide an image processing system which enables an operator to specify the part of an image received from a transmission system that is to be printed out, and which enables the operator to easily check which part of the received image is to be printed out.

To achieve this object, according to the present invention, there is provided an image processing system having image communication means capable of receiving image image information from a destination apparatus. The image processing system is provided with memory means for storing received image information, display means for displaying an image on a display screen, printing means for printing out the image information to a recording medium, first control means arranged to alter the size of an image carried by the image information stored in the memory means according to the size of the original image and output the image of altered size to the display means, second control means for displaying a desired portion of a reference image at a desired magnification, the reference image being an image displayed under the control of the first control means, and third control means arranged to alter the size of the image carried by the image information stored in the memory means at the magnification controlled by the second control means and produce a printout of the image of altered size.

The above and other objects, features and advantages of the present invention will be apparent from the following description of embodiments of the invention with reference to the accompanying drawings.

BRIEF DESCRIPTION OF THE DRAWINGS

FIG. 8A is a flow chart showing the process of reading an original image;

FIG. 8B is a flow chart showing the process of display an image;

FIG. 15 is a table showing the relationship between the state of a signal supplied to the selector of FIG. 14 and the resulting display image;

DESCRIPTION OF THE PREFERRED EMBODIMENTS

Figure 1:
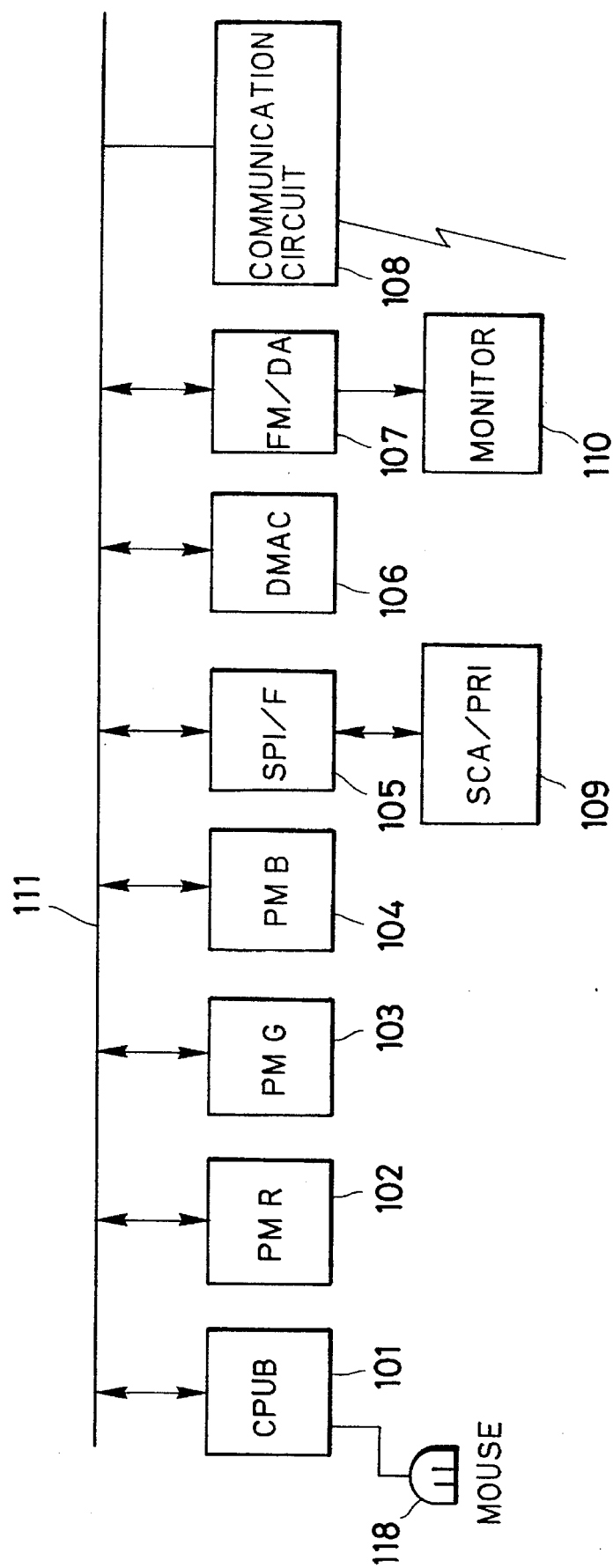
FIG. 1 is a block diagram showing a first embodiment of an image processing system according to the present invention.

FIG. 1 is a block diagram showing a first embodiment of an image processing system according to the present invention.

In the illustrated image processing system, boards having different functions are connected to one another through a system bus. A CPU board CPUB 101 controls all the boards 102–108 through a system bus 111. Numeral 118 denotes a mouse for commanding.

Page memories PMR 102, PMG 103 and PMB 104 serve as image buffers each capable of storing one page of image information corresponding to red, green and blue, respectively. These page memories are connected to a scanner/printer system SCA/PRI 109 through a scanner/printer interface SPI/F 105.

A direct memory access controller DMAC 106 reads data from the page memories PMR 102, PMG 103 and PMB 104, and transfers the read data to an FM/DA board 107 having a monitor frame memory for writing purposes.

The FM/DA board 107 further includes a D/A conversion circuit so as to display an image on a monitor 110. A communication circuit 108 is selectively operative to transmit and receive image data to and from a separate system which is substantially the same as the illustrated system. For example, the communication circuit 103 is capable of reading image data from the page memories PMR 102, PMG 103 and PMBG 104 and transferring the image data to the separate system.

The specific arrangement and construction of the scanner/printer SCA/PRI 109 will now be explained with reference to FIGS. 2A and 2B.

The apparatus shown in FIGS. 2A and 2B comprises a digital color image scanning assembly (hereinafter referred to as a "color scanner means") 1 and a digital color image printing assembly 2 (hereinafter referred to as a "color printer means"), and the color scanner means 1 is usually disposed above the color printer means 2 as shown. The color scanner means 1 is arranged to read color image information from an original for each color by a combination of color separating means and a photo-electric conversion device such as a CCD, and convert the read color image information into electrical digital image signals. The color printer means 2 is arranged to reproduce color images corresponding to the respective color components in accordance with the digital image signals. The color printer means 2 is an electrophotographic-type laser beam color printer which transfers the image information for each color component to a recording sheet to record it in a digital dot form.

The layout of the color scanner means 1 will be explained below.

The color scanner means 1 comprises a platen glass 4 on which an original 3 is placed, a rod array lens 5, a full-size full-color sensor 6, a sensor output signal amplifying circuit 7 and a halogen exposure lamp 10. The rod array lens 5 focuses a light image reflected from the original 3, which is being scanned and exposed by the halogen exposure lamp 10, onto the full-size full-color sensor 6 as an image input. These elements 5, 6, 7 and 10 integrally move as an original scanning unit 11 to scan the original 3 for exposure purposes in the direction indicated by an arrow A1. A color separation image signal for one color which is read during exposure scanning is amplified to a predetermined voltage in the sensor output signal amplifying signal 7. The amplified color separation image signal is supplied to a video processing unit 12 over a signal line 501 for the purpose of signal processing. The signal line 501 is preferably made from a coaxial cable capable of assuring faithful transmission of signals. A signal line 502 is provided for transmission of drive pulses to the full-size full-color sensor 6, and the required drive pulses are generated by the video processing unit 12. As will be explained later, a white plate 8 and a black plate 9 are provided for correcting the white and black levels of an image signal, respectively. The halogen exposure lamp 10 illuminates the white and black plates 8 and 9 to produce signal levels each having a predetermined density, and these signal levels are utilized for correcting the white and black levels of a video signal. A control unit 13 having a microcomputer provides control over the display operation of an operating panel 20, key inputs through the operating panel 20 and the video processing unit 12 through a bus 508. The control unit 13 also controls position sensors S11 and S21 to detect the position of the original scanning unit 11 through signal lines 509 and 510. Further, the control unit 13 controls a stepping-motor driving circuit which drives a stepping motor 14 for moving the original scanning unit 11 by the application of pulses, and provides on-off control over the halogen exposure lamp 10 and controls the intensity of illumination thereof through a signal line 505. Through a signal line 505 are controlled a digitizer 16, internal keys and a display section. In this manner, the control unit 13 controls all the elements of the color scanner means 1 through the respective signal lines. A color image signal which is read by the original scanning unit 11 during exposure scanning thereof is supplied to the video processing unit 12 through the amplifying circuit 7 and the signal line 501, and the video processing unit 12 applies various processes, which will be explained later, to the color image signal. The signal thus-processed is transferred to the color printer means 2.

The schematic arrangement of the color printer means 2 will now be explained below. The color printer means 2 comprises a scanner 711 which includes a laser output device for converting the image signal received from the color scanner means 1 into an optical signal, a polygon mirror 712 having a polygonal shape (for example, an octahedral shape), a motor (not shown) for rotating the polygon mirror 712, an f/θ lens (focusing lens) 713 and the like. The color printer means 2 also comprises a reflection mirror 714 for changing the optical path of laser light and a photosensitive drum 715. Laser light emitted from the laser output unit is reflected by the polygon mirror 712, passed through the f/θ lens 713, and directed to the photosensitive drum 715 by the reflection mirror 714 to effect linear scanning (raster scanning) of the surface of the photosensitive drum 715. In this manner, a latent image corresponding to the original image is formed.

Disposed around the photosensitive drum 715 are a primary charger 717, a whole-image exposure lamp 718, a cleaner section 723 for collecting the residual non-transferred toner, and a transfer charger 724.

A developing unit 726 develops the electrostatic latent image formed on the surface of the photosensitive drum 715.

The developing unit 726 comprises developing sleeves 731Y, 713M, 731C and 713Bk each of which effects development in direct contact with the photosensitive drum 715, toner hoppers 730Y, 730M, 730C and 730Bk for preserving spare toner, screws 732 for feeding corresponding developers. The developing sleeves 731Y-713Bk, the toner hoppers 730Y-730Bk and the screws 732 are disposed around the rotating axis P of the developing unit 726. In these reference numerals, Y, M, C and Bk represent colors, that is, yellow, magenta, cyan and black, respectively. When a yellow toner image is to be formed, development using yellow toner is performed with the developing unit 726 in the illustrated position. When a magenta toner image is to be formed, the developing unit 726 is rotated about the rotating axis P to the position where the developing sleeve 731M is in contact with the photosensitive drum 715. A cyan toner image and a black toner image are likewise developed.

A transfer drum 716 transfers the toner image formed on the photosensitive drum 715 onto a recording sheet. Around the transfer drum 716 are disposed an actuator plate 719 for detecting the position of the transfer drum 716 which is rotating, a position sensor 720 disposed close to the actuator plate 719 for detecting whether the transfer drum 716 has reached its home position, a transfer drum cleaner 725, a sheet pressing roller 727, a charge canceling device 728 and a transfer charger 729.

Sheet feed cassettes 735 and 736 accommodate sheets. In the illustrated embodiment, it may be assumed that the sheet feed cassettes 735 and 736 accommodates A4-size and A3-size sheets, respectively. Sheet feed rollers 737 and 738 are operative to feed sheets from the sheet feed cassettes 735 and 736, respectively, and timing rollers 739 and 740 are arranged to time the feeding and transportation of each sheet. A sheet, which is transported by way of these elements, is conducted by a sheet guide 749 and wound around the transfer drum 716 with the leading end of the sheet gripped by a gripper which will be explained later. Subsequently, the sheet is subjected to an image forming process.

A drum rotating motor 550 synchronously rotates the photosensitive drum 715 and the transfer drum 716. A peeling claw 750 peels the sheet attracted to the transfer drum 716 by an electrostatic action after the completion of the image forming process. A transporting belt 742 transports the peeled sheet to an image fixing section 743, where the image formed on the sheet is fixed. The image fixing section 743 includes a part of heat pressure rollers 744 and 745.

The control unit 13 of the color scanner means 1 will now be explained with reference to FIG. 3.

The control unit 13 includes a CPU 22 which organically controls the video signal processing unit 12 through a signal line (bus) 508, a lamp driver 21 for exposure scanning through a signal line 504, a stepping motor driver 15 through a signal line 503, the digitizer 16 through a signal line 505 and the operating panel 20 through the signal line 508, and so on by means of a programmed ROM 23, a RAM 24 and a RAM 25. The involatility of the RAM 25 is assured by a battery 31. The signal line 505 is a general signal line for serial communications, and an operator inputs various information through the digitizer 16 in accordance with the protocol provided between the CPU 22 and the digitizer 16. Over the signal line 505 are entered edit commands indicative of, for example, coordinates for movement, synthesis or the like, designation of an area, selection of copy modes or alteration of magnification. The CPU 22 supplies commands indicative of scanning speed, scanning distance, forward or rearward motion or the like to the motor driver 15 over the signal line 503. The motor driver 15 supplies predetermined pulses to the stepping motor 14 in accordance with a command received from the CPU 22, thereby driving the stepping motor 14.

Serial I/F's 29 and 30 may usually be realized with LSI's for serial I/F such as Intel "8251". Although not shown, the digitizer 16 and the stepping motor driver 15 also have similar circuits.

The sensors S11 and S21 are provided for detecting the position of the original scanning unit 11. The sensor S11 detects the home position of the original scanning unit 11, and the white level of an image signal is corrected when the original scanning unit 11 is rested in the home position. The sensor S21 detects whether the original scanning unit 11 has reached the leading edge of an image. The position corresponding to the leading edge of the image serves as the reference position of the original.

Figure 2A:
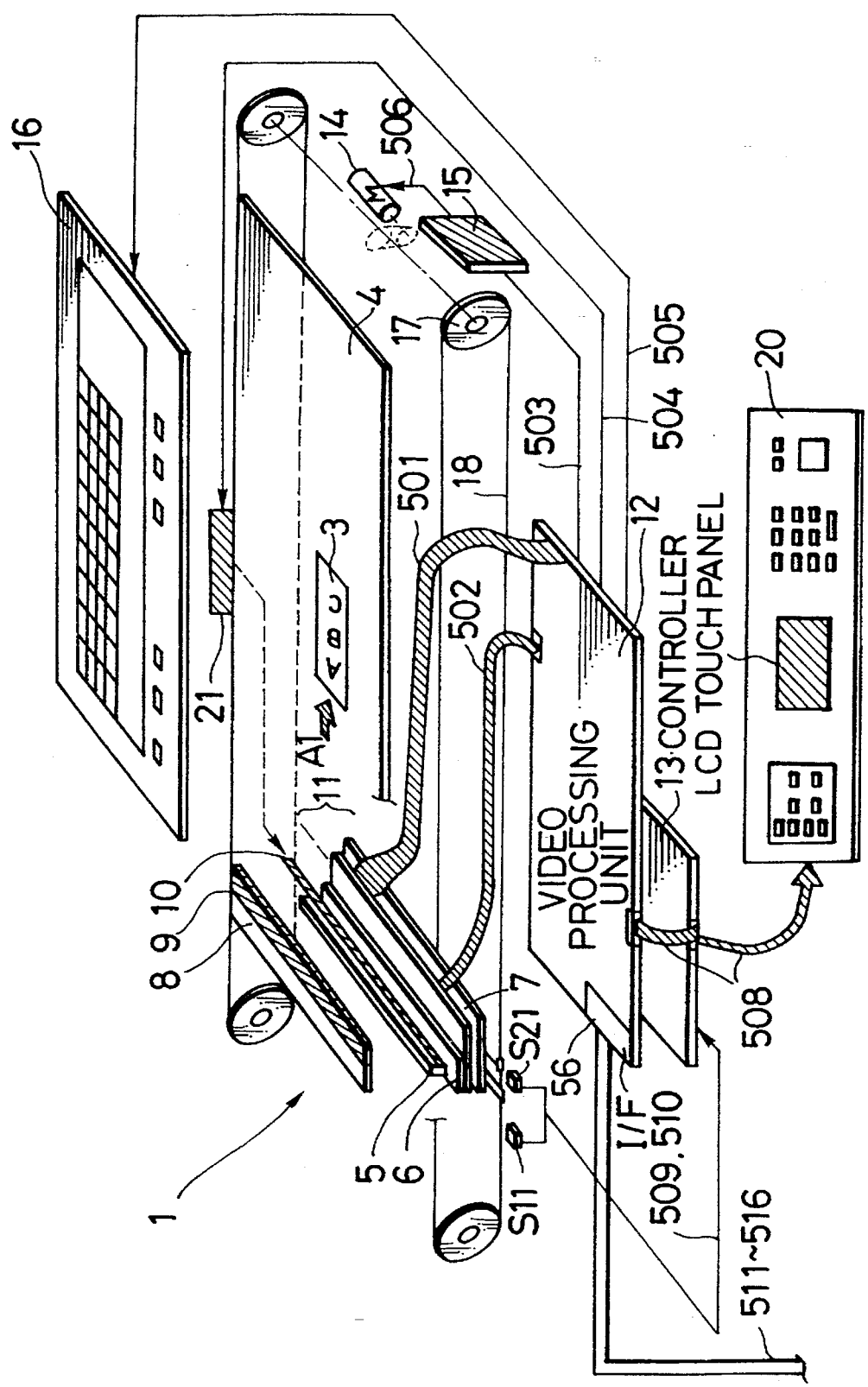
FIGS. 2A and 2B are schematic views showing the arrangements of a scanner and a printer in the first embodiment.
Figure 2B:
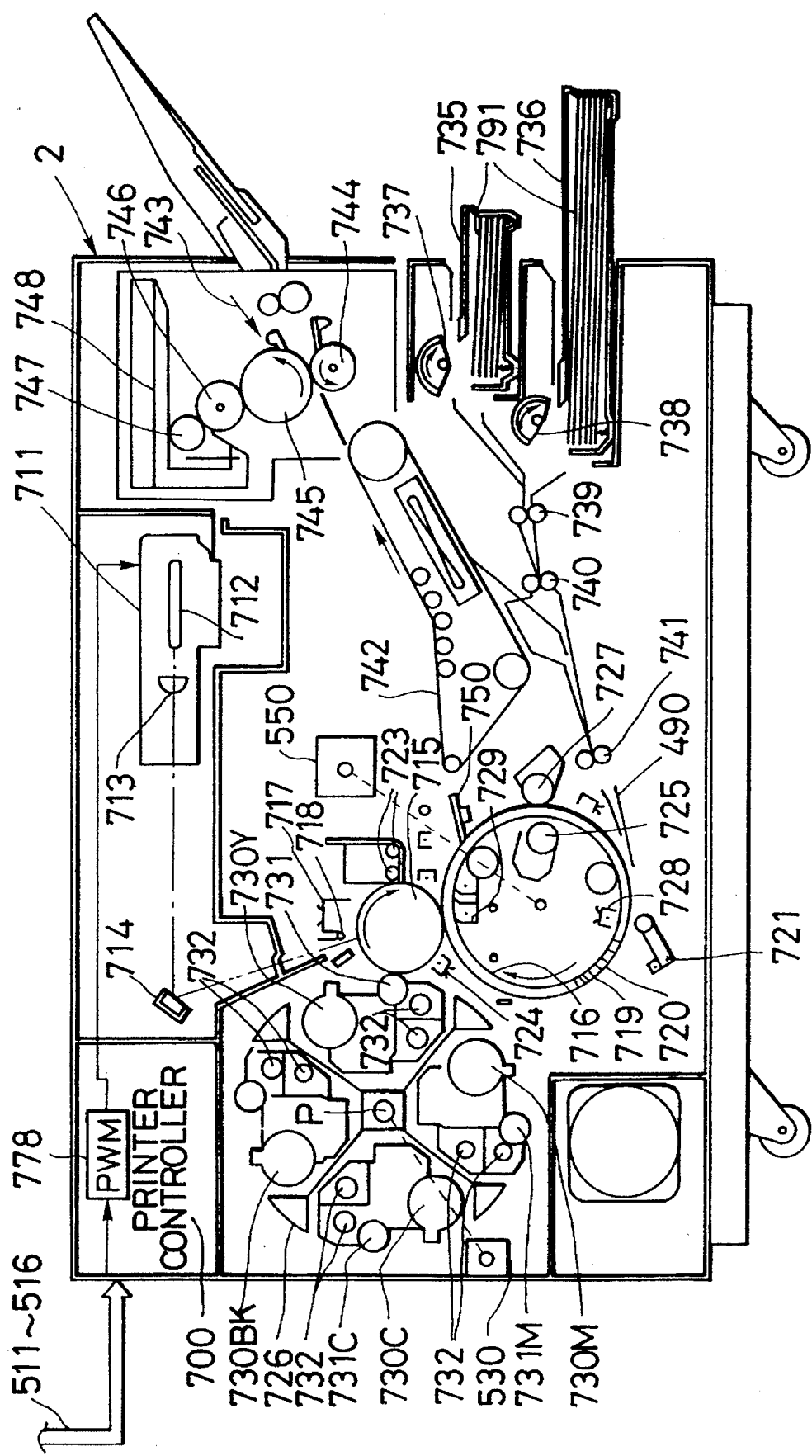
Figure 3:
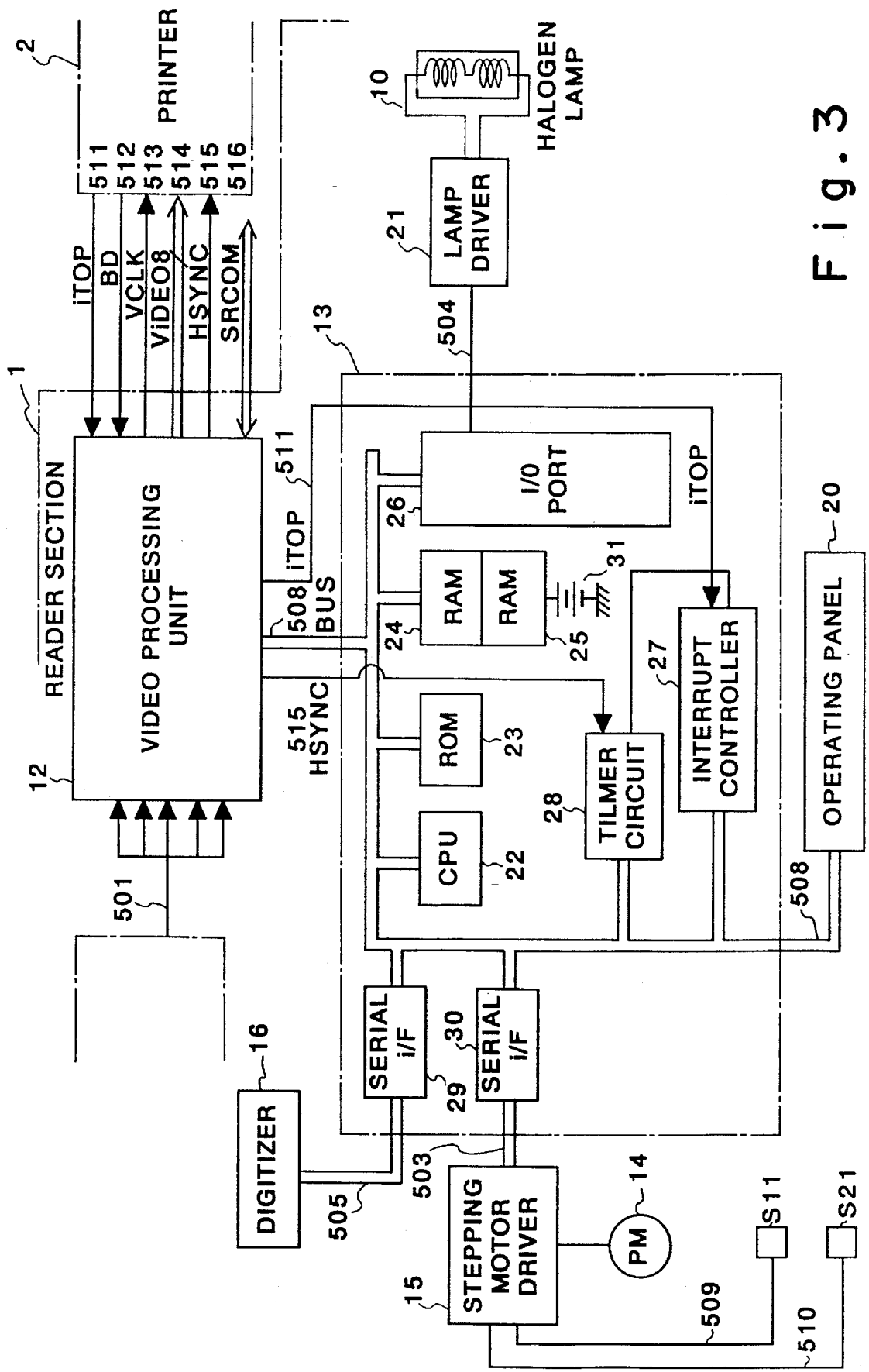
FIG. 3 is a block diagram showing the arrangement of a controller and peripheral elements in the embodiment of FIGS. 2A and 2B.

In FIG. 3, signals ITOP 511, BD 512, VCLK 513, VIDEO 514, HSYNC 515 and SRCOM 516 are interface signals transferred between the color printer section 2 and the color scanner section 1 shown in FIGS. 2A and 2B. The image signal VIDEO 514 which is read in the color scanner means 1 is transferred to the color printer means 2 in accordance with the aforesaid signals. The signal ITOP 511 is a synchronizing signal relative to the direction of image transmission and is generated once each time one picture is transferred, that is, a total of four times when images of four colors—yellow, magenta, cyan and black—are transferred. The signal ITOP 511 causes an image portion at the leading end of the original image to coincide with the leading edge of a transfer sheet wound around the transfer drum 716 in the color printer section 2 when a toner image is to be transferred onto the transfer sheet. The signal ITOP 511 is synchronized with the rotation of the transfer drum 716 and the photosensitive drum 715. The signal ITOP 511 is also supplied as an interrupt signal to the video processing unit 12 in the color scanner means 1 as well as a CPU 22 in the controller 13. The CPU 22 provides image control with respect to the sub-scan direction for the purposes of editing or the like with reference the interrupt signal ITOP. The signal BD 512 is a synchronizing signal relative to the direction of raster scanning and is generated once at one rotation of the polygon mirror 712, that is, once at each raster scanning cycle. The image signal, reach in the color scanner means 1, is transferred to the color printer means 2 in synchronization with the signal BD 512 which is generated line by line in the main-scan direction. The signal VCLK 513 is a synchronizing clock which is utilized in transferring the 8-bit digital video signal VIDEO 514 to the color printer means 2. The video signal VIDEO 514 is transferred to the color printer means 2 through a flip-flop circuit in synchronization with the signal VCLK 513. The signal HSYNC 515 is a synchronizing signal relative to the main-scan direction which is derived from the signal BD 512 in synchronization with the signal VCLK 513, and has the same period as the signal BD 512. Strictly speaking, the signal VIDEO 514 is transferred in synchronization with the signal HSYNC 515. The reason for this is that the signal BD 515 is generated in synchronization with the rotation of the polygon mirror 712 and therefore contains large amounts of jitters derived from a motor which rotates the polygon mirror 712. It follows that if the signal VIDEO 514 is directly synchronized with the signal BD 515, an image which contains jitters may be formed. To avoid such a phenomenon, the signal VIDEO 515 is synchronized with the signal HSYNC 515 which is generated in synchronization with the VCLK signal free from jitters. A signal line SRCOM 516 is provided for half-duplex bi-directional serial communications, and commands indicative of, e.g., selection from color modes or selection from sheet feet cassettes or status information on the color printer means 2, e.g., the presence or absence of a jam, shortage of sheets, the occurrence of a wait or the like are communicated between the color scanner means 1 and the color printer means 2.

Explanation of Inputting of Image Data

The scanner/printer system SCA/PRI 109 which is made up of the color scanner means 1 and the color printer means 2 as described above is connected to the scanner/printer interface SPI/F 105. When the SPI/F 105 receives an image read command from the CPU board CPUB 101 over the system bus 111, the SPI/F 105 activates the SCA/PRI 109 to start reading the image. The SCA/PRI 109 is a scanner/printer arranged to input or output an image in a frame-sequential manner, and inputs or outputs individual color components R (red), G (green) and B (blue) in sequence for each page.

The scanner/printer interface SPI/F 105 which has received the image read command serves as a bus master and output image data directly to the system bus 111 in real time. At this time, the CPU board CPUB 101 is placed in the state of waiting for an interrupt, and the scanner/printer interface SPI/F 105 supplies to the system bus 111 a signal (memory selection signal) that specifies which board is to be accessed from among the page memories PMR 102, PMG 103 and PMB 104. Each of the pages memory PRM 102, PMG 103 and PMB 104 determines whether the board number specified by the memory selection signal coincides with the board number of itself. Only when a page memory determines that the memory selection signal coincides with the board number of itself, the page memory reads in image data for one page from the system bus 111. In this manner, as the image data are sequentially outputted for three colors (R, G and B) from the scanner/printer SCA/PRI 109, the corresponding one of the page memories PMR 102, PMG 103 and PMB 104 reads the image data from the system bus 111. If the scanner/printer SCA/PRI 109 can simultaneously input and output image data for three colors (R, G and B), by increasing the data bus width of the system bus 111, it is possible to write the required image data into the page memories PMR 102, PMG 103 and PMB 104 in a signal scanning cycle. When the image data are written to all the page memories, the scanner/printer interface SPI/F 105 generates an interrupt signal on the system bus 111 to transfer the control of the system bus 111 to the CPU board CPUB 101.

Explanation of Outputting of Image Data

When a hard copy is to be produced from the image data which are read into the page memories PMR 102, PMG 103 AND PMB 104 in the above-described manner, the scanner/printer interface SPI/F 105 transmits the image data to the scanner/printer SCA/PRI 109.

When the scanner/printer interface SPI/F 105 receives a image write command from the CPU board CPUB 101 over the system bus 111, the SPI/F 105 activates the scanner/printer SCA/PRI 109 and serves as a bus master in itself. The SPI/F 105 sequentially supplies the image data for each color from each board of the page memories PMR 102, PMG 103 and PMB 104 to the scanner/printer SCA/PRI 109. During this time, the CPU board CPUB 101 is in the state of waiting for an interrupt. When the required image data have been outputted to the scanner/printer SCA/PRI 109, the scanner/printer interface SPI/F 105 generates an interrupt signal on the system bus 111 to transfer control to the CPU board CPUB 101.

Explanation of Display of Image

Figure 4:
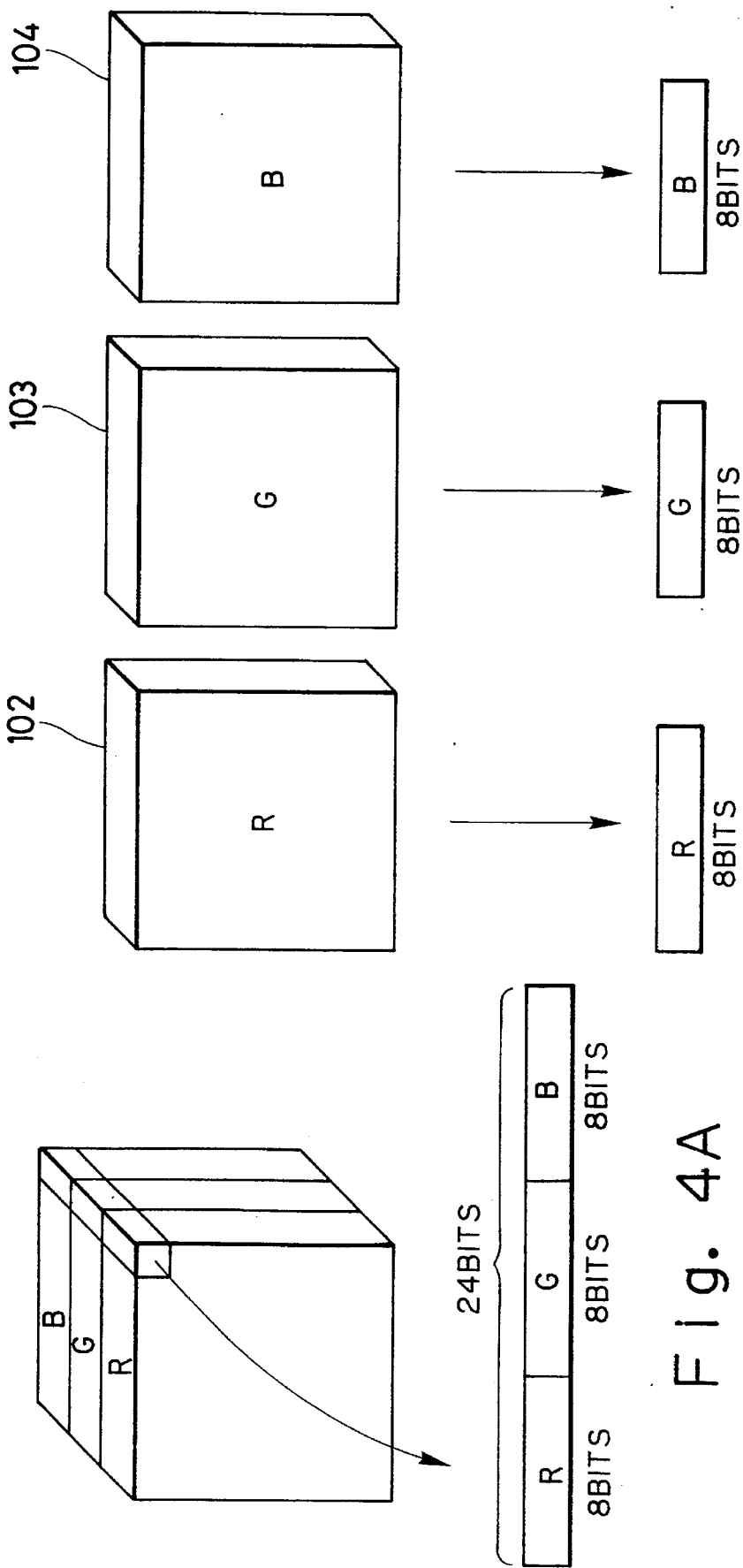
FIG. 4A is a view schematically showing the bit map of a display memory for each color component in the embodiment.
FIG. 4B is a view schematically showing the bit map of a page memory for each color component which serves as an image memory in the embodiment.

When the image data are stored in the page memories PMR 102, PMG 103 and PMB 104, each of the page memories stores color data for a corresponding color in a different address space as shown in FIG. 4B. In the monitor frame memory FM/DA 107, color data for three color (R, G and B) is mapped in the same address space as shown in FIG. 4A. If the former memory is addressed, one of the R, G and B data is outputted, while, if the latter memory is addressed, packed data of the three colors R, G and B is output. The former and latter memories are hereinafter referred to as the "frame-sequential memory" and the "pixel-sequential memory", respectively.

Figure 5:
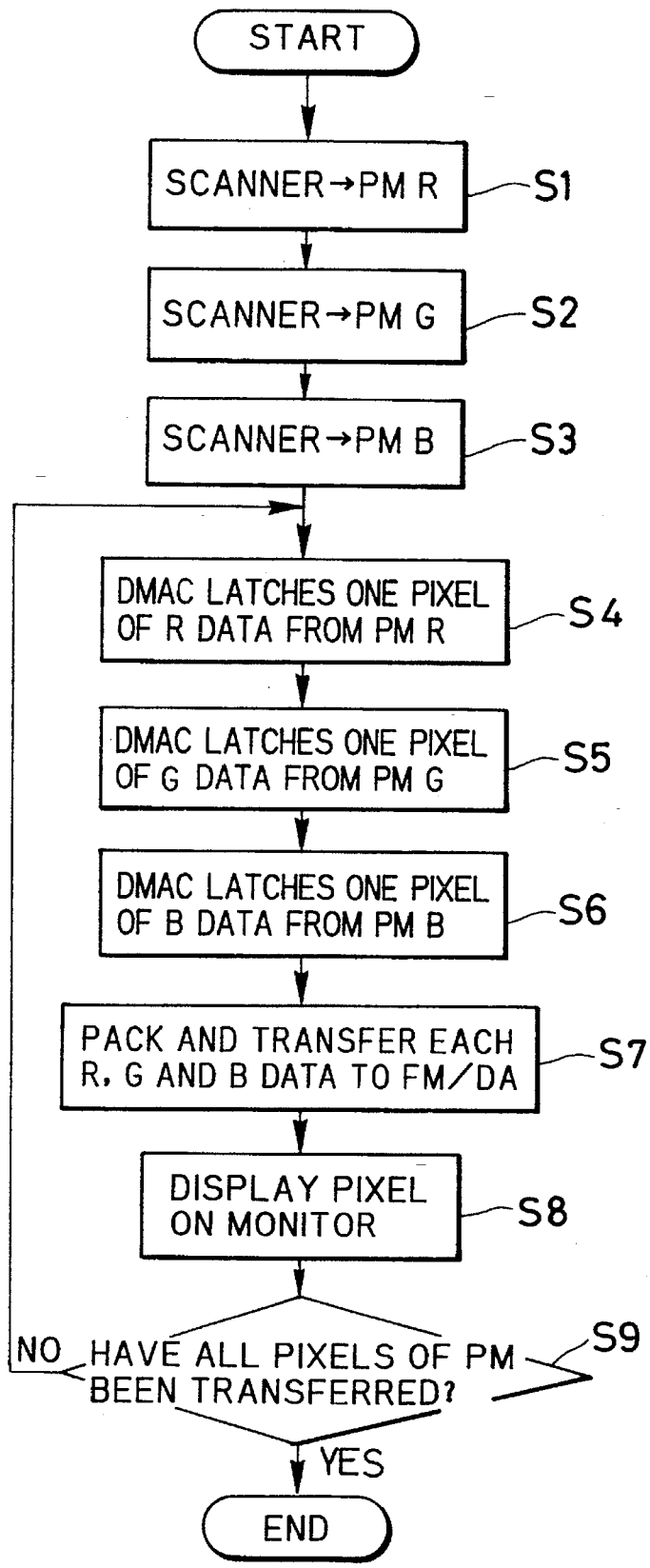
FIG. 5 is a flow chart showing a process which starts with an image reading step and ends with an image displaying step in the first embodiment.

The control of an image display will be explained with reference to the flow chart of FIG. 5.

In Step S1, when the CPU board CPUB 101 supplies an image read signal to the scanner/printer interface SPI/F 105 over the system bus 111 as described above, the scanner/printer interface SPI/F 105 activates the scanner/printer SCA/PRI 109, whereby R image data for one page is written to the page memory PMR 102. Similarly, in Steps S2 and S3, G data and B data are stored in the page memories PMG 103 and PMB 104, respectively. When the image data for the three colors are stored in all the page memories, the scanner/printer interface SPI/F 105 generates an interrupt signal and the CPU board CPUB 101 again serves as a bus master. Throughout Steps S4–S9, the CPU board CPUB 101 transfers control to the direct memory access controller DMAC 106. In Step S4, the DMAC 106, which serves as the bus master, reads R data for one pixel (8 bits) from the R data page memory PMR 102 and stores it in itself. In Step S5, the DMAC 106 reads G data for one pixel from the G data page memory PMG 103 and stores it in itself. In Step S6, B data is also stored similarly. In Step S7, the R, G and B 8-bit data are packed and transferred to the monitor frame memory FM/DA 107 as 24-bit data. The frame memory FM/DA 107 is a dual-port memory having two ports and is capable of displaying the content on the monitor 110 while the FM/DA 107 is being accessed over the system bus 111 by the CPU board CPUB 101 or the DMA controller DMAC 106. In Step S9, it is determined whether the image data for one page have been transferred to the monitor frame memory FM/DA 107 from each of the page memories PMR 102, PMG 103 and PMB 104. If the image data have not yet been transferred, the process returns to Step S4 for the purpose of transferring image data on the next pixel. Subsequently, the aforesaid steps S4–S9 are repeated until all the image data have been transferred. If all the image data for one page have been transferred, the DMA controller DMAC 106 generates an interrupt signal on the system bus 111 and transfers control to the CPU board CPUB 101.

The following is an explanation of a second embodiment of the present invention.

Figure 6:
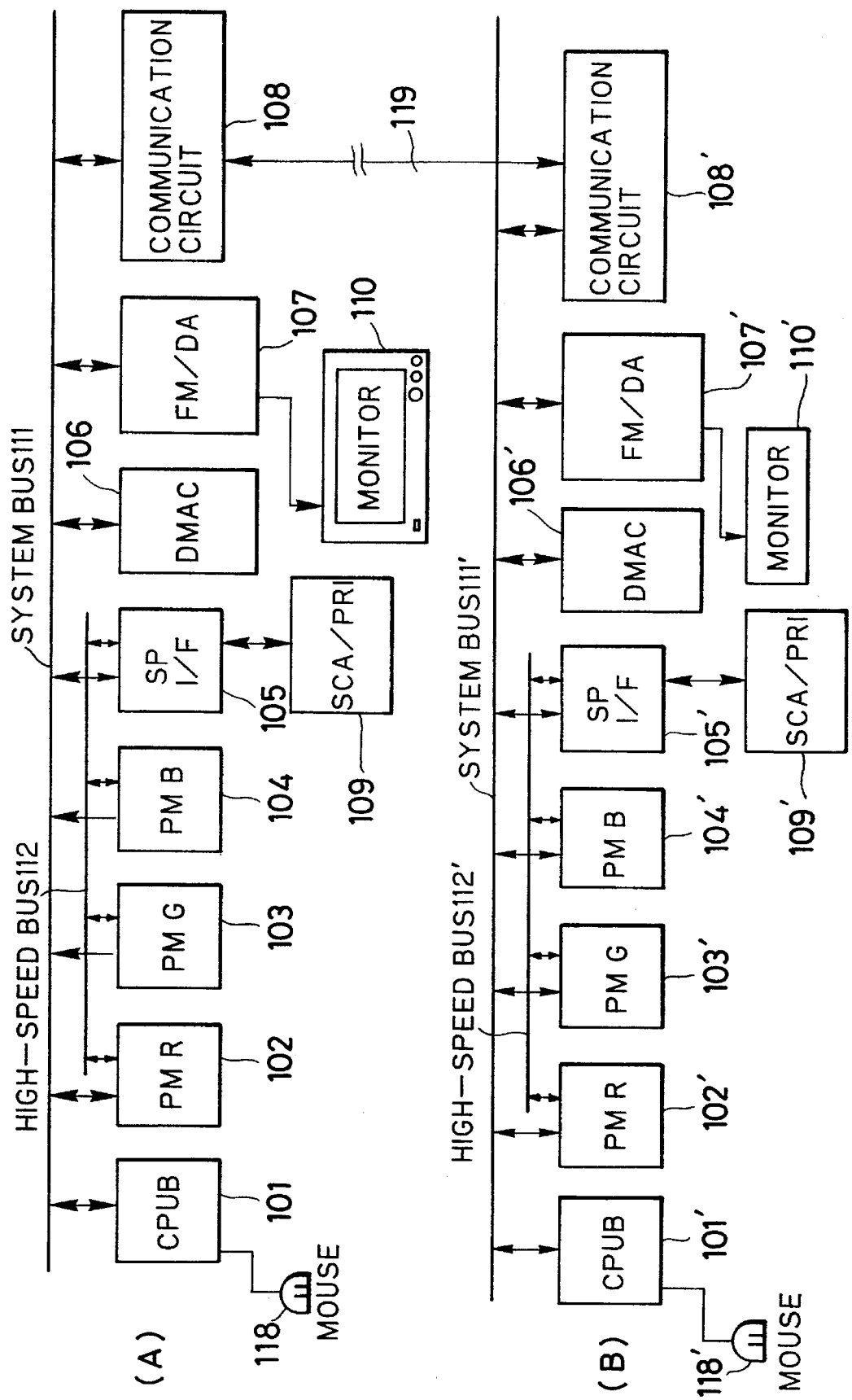
FIG. 6 is a circuit diagram showing a second embodiment of the image processing system according to the present invention.

FIG. 6 is a block diagram showing the second embodiment of the present invention.

In the following explanation, elements which differ from those used in the first embodiment will be referred to, and description of the same elements will be omitted.

In the second embodiment, not only the system bus 111 but a high-speed bus 112 is provided between the page memories PMR 102, PMG 103 and PMB 104 and the scanner/printer interface SPI/F 105.

An arrangement which makes it possible to communicate data between a plurality of systems as illustrated will be explained below. To distinguish between a system A and a system B, the each element of the system B, which corresponds to the system A, is indicated by the corresponding numeral with a prime.

Figure 7:
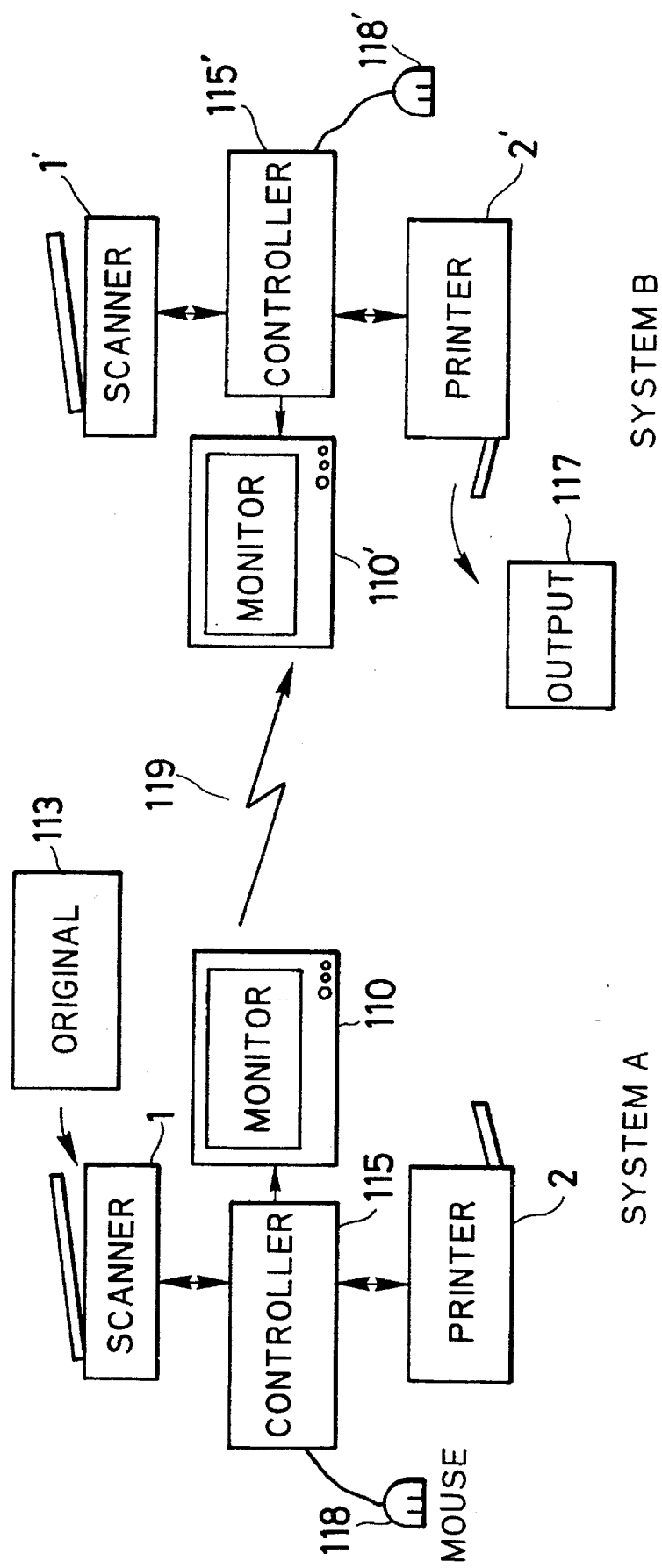
FIG. 7 is a schematic diagram showing the state of image communication between two systems.

To begin with, image communications between a plurality of systems will be considered. In FIG. 7, the image formed on an original 113 in the system A is generally transferred to the printer 2' in the system B in the following manner.

An image is read from the original 113 by the color scanner means 1, and the obtained image data are stored in the page memories PMR 102, PMG 103 and PMB 104 provided in a controller 115. The controller 115 comprises all the constituent elements directly connected to the system bus 111 and the high-speed bus 112 shown in FIG. 16. In parallel with the above storage process, the image data are transferred to the monitor frame memory FM/DA 107 through the DMA controller (DMAC) 106 by a DMA (direction memory access) method, whereby the image which is being read is displayed on the monitor 110. When the reading is completed, a user may convert the color tone of the image displayed on the monitor 110, enlarge the size of the image, and so on, by using a pointing device such as a mouse 118, thereby altering the image to be transferred to the system B while visually confirming the image displayed on the monitor 110. Then, the image data are transferred to a line 119 through the communication circuit 108 and is also stored in the page memories PMR 102', PMG 103' and PMB 104' provided in the controller 115' of the system B through the communication circuit 108'. In this manner, the image data are transferred to the system B. The data stored in the page memories PMR 102', PMG 103' and PMB 104' in the controller 115' of the system B is transferred to the monitor frame memory FM/DA 107' by the DMAC 106' and displayed on the monitor 110' of the system B. Thus, a user on the reception side can view the transferred image. Further, the image data is transferred to the printer 2' from the page memories PMR 102', PMG 103' and PMB 104' through the scanner/printer interface SPI/F 105' provided in the controller 115', and a hard copy 117 is produced.

Image communications between the systems are accomplished as described above. If desired, the user on the reception side can also arbitrarily alter the color tone, the size and so on, of the image displayed on the monitor 110 to obtain a printout from the color printer 2. The above process generally comprises the steps of (1) inputting image data, (2) displaying image data, (3) outputting image data, and (4) transferring image data. The respective steps in the second embodiment will be explained below.

Explanation of Inputting of Image Data

The scanner/printer system SCA/PRI 109 which is made up of the color scanner means 1 and the color printer means 2 is connected to the scanner/printer interface SPI/F 105. When the SPI/F 105 receives an image read command from the CPU board CPUB 101 over the system bus 111, the SPI/F 105 activates the scanner/printer SCA/PRI 109 to start reading the image. The SCA/PRI 109 is a frame-sequential type scanner/printer, and inputs or outputs individual color components R, G and B in sequence for each page.

The scanner/printer interface SPI/F 105 which has received the image read command, serves as a bus master of the high-speed bus 112 and outputs image data directly to the high-speed bus 112 in real time. At this time, the CPU in the CPUB 101 is placed in the state of waiting for an interrupt. Simultaneously, the scanner/printer interface SPI/F 105 supplies to the high-speed system bus 112 a signal (memory selection signal) that specifies which board is to be accessed from among the page memories PMR 102, PMG 103 and PMB 104. Each of the pages memory PRM 102, PMG 103 and PMB 104 determines whether the board number specified by the memory selection signal coincides with the board number of itself. Each of the pages memory PRM 102, PMG 103 and PMB 104 determines whether the board number specified by the memory selection signal coincides with the board number of itself. Only when a page memory determines that the memory selection signal coincides with the board number of itself, the page memory reads in image data for one page from the high-speed bus 112. In this manner, as the image data for three colors (R, G and B) are sequentially outputted from the scanner/printer SCA/PRI 109, the corresponding one of the page memories PMR 102, PMG 103 and PMB 104 reads the image data from the high-speed bus 112. If the scanner/printer SCA/PRI 109 can simultaneously input and output image data for three colors (R, G and B), by increasing the data bus width of the system bus 111, it is possible to write the required image data into the page memories PMR 102, PMG 103 and PMB 104 in a signal scanning cycle.

In the second embodiment, each time data on one color component of one page is written to a page memory, the scanner/printer interface SPI/F 105 generates an interrupt signal on the system bus 111 to inform the CPU CPUB 101 of that fact.

Although the image data which is been stored for each color may also be directly transferred through the communication circuit 109, the illustrated system has the function of synthesizing the image data for each color stored in the page memories PMR 102, PMG 103 and PMB 104, and displaying the obtained image on the monitor 110.

Explanation of Displaying of Image Data

When the CPUB 101 receives an interrupt signal from the SPI/F 105, the CPUB 101 activates the DMA controller (DMAC) 106 and sequentially transfers image data from a particular page memory to the frame memory FM/DA 107 after writing to the page memory has been completed. At this time, the DMAC 106 enlarges the image stored in the page memories PMR 102, PMG 103 and PMB 104 to a full size or reduce the number of pixels by omission, and writes the obtained image data into the memory of the monitor frame memory FM/DA 107. The monitor frame memory FM/DA 107 sequentially reads the image data from the memory, applies D/A conversion to the read image data, and outputs the result to the monitor 110 connected to the FM/DA 107. The monitor frame memory FM/DA 107 is a dual-port memory into which the CPU 101 or the DMAC 106 can write image data while an image is being displayed on the monitor 110. Accordingly, a disturbed image is not displayed.

The above processings will be summarized below.

The flow of data over the high-speed bus 112 is as shown in FIG. 8A. The respective color component data supplied from the color scanner 1 are stored in the page memories PMR102, PMG 103 and PMB 104 in sequence (Steps S10–S12) and a corresponding image is displayed on the monitor 110 (Step S13).

The flow of data over the system bus 111 is as shown in FIG. 8B. After R data has been read, the data stored in the page memory PMR 102 is transferred to the frame memory FM/DA 107 (Steps S14 and S15). It is to be noted that, since the second embodiment comprises two buses, the next color component G data can be read into the page memory PMG 103 through the color scanner means 1 during the operation of DMAC 106. Subsequently, G data and B data are also be transferred by the same processes.

Figure 9:
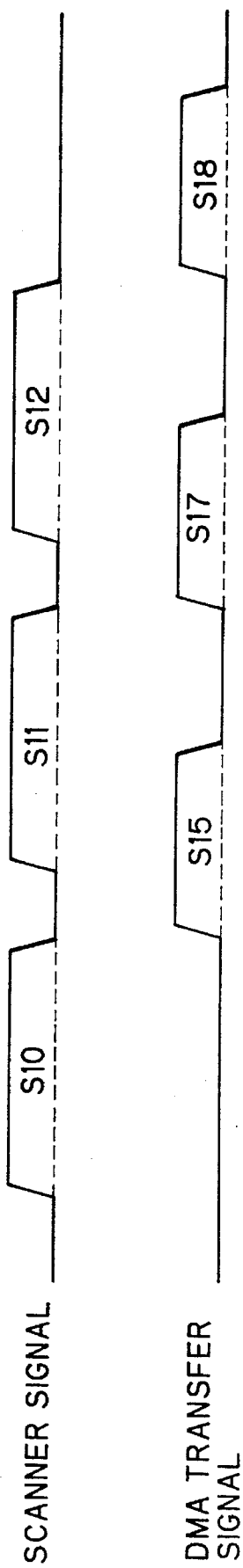
FIG. 9 is a flow chart showing the state of process in the flow chart of each of FIGS. 8A and 8B.

FIG. 9 is a timing chart which shows the process steps of FIGS. 8A and 8B in relation to time.

As described above, by providing two buses of the system bus 111 and the high-speed bus 112, it is possible to materially reduce the time period which passes from the scanning of an original by a scanner until the displaying of a reproduced image on a monitor. Scanning is performed for each of R, G and B—a total of three times and, when the first scanning cycle is completed, the whole image in red (R) can be visually confirmed.

The following is an explanation of a method of changing the color tone of an image displayed on the monitor 110.

The color tone of an image can be changed in order to alter the color of an image to be transferred or to alter the color of a received image before producing a hard copy thereof.

Figure 10:
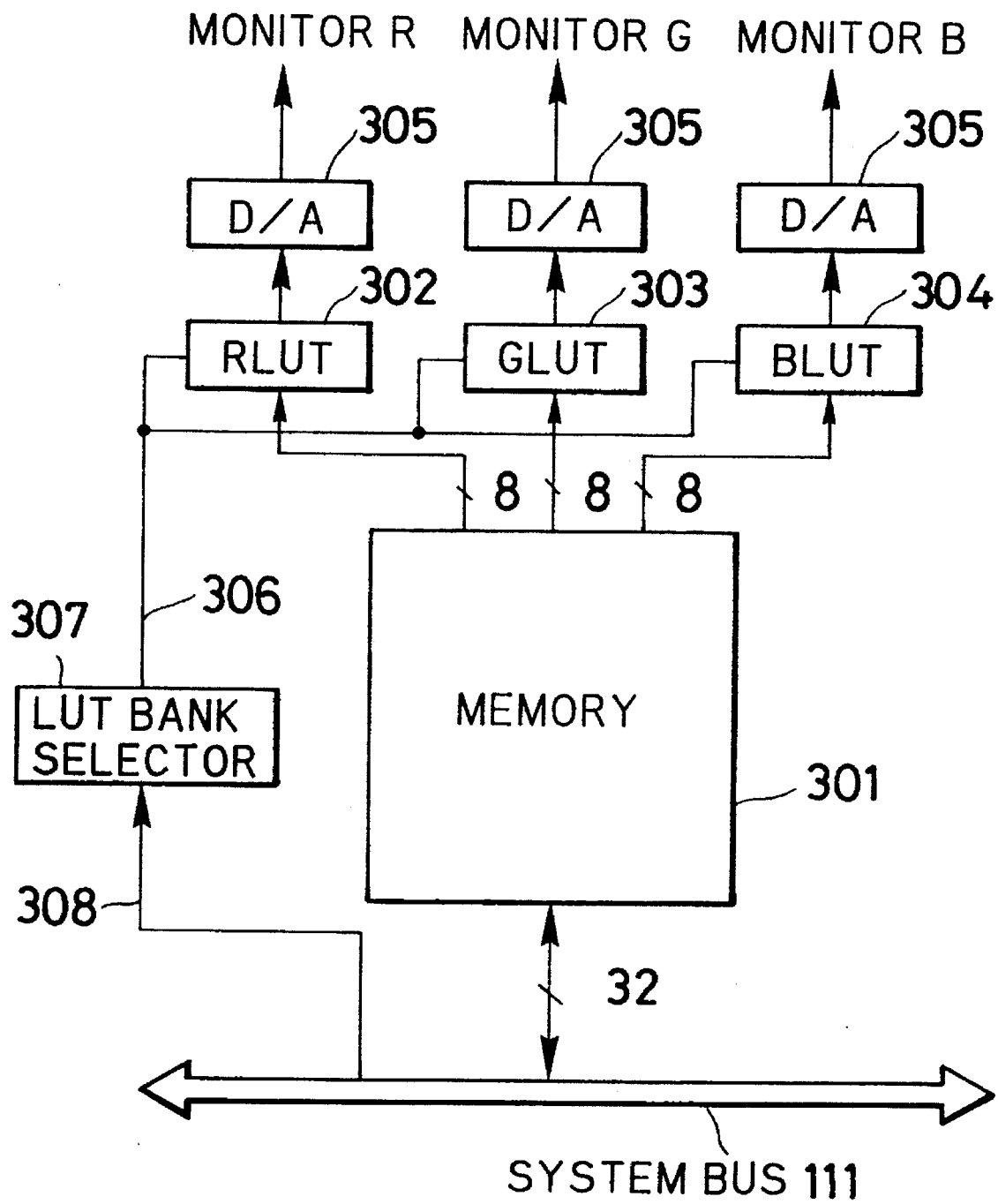
FIG. 10 is a block diagram showing a circuit arrangement for altering the color tone of an image to be displayed on a display screen.

FIG. 10 is a block diagram showing the details of the frame memory FM/DA 107.

Figure 11:
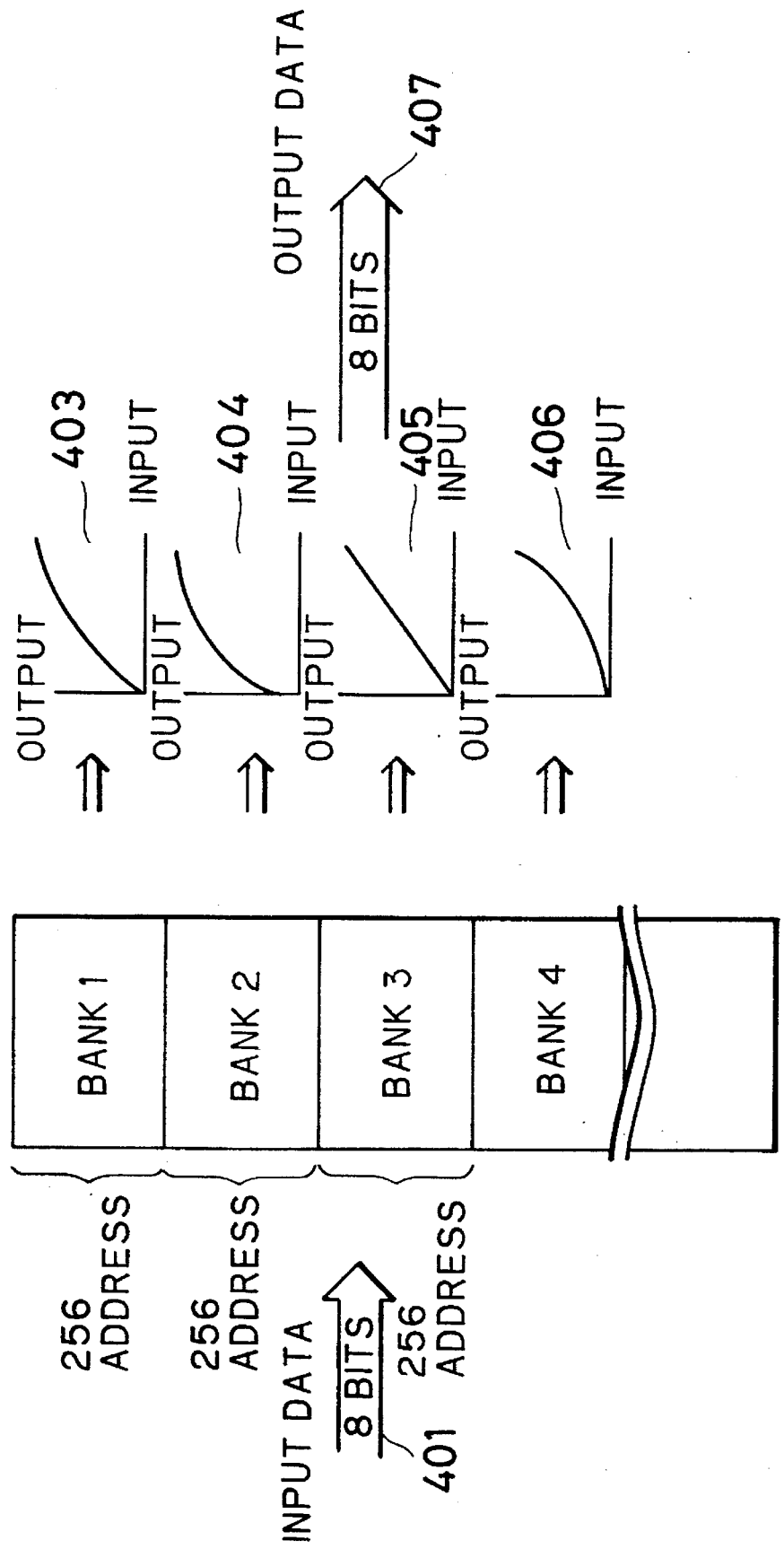
FIG. 11 is a view showing the switchable conversion characteristics of the look-up tables shown in FIG. 10.

As shown, the R, G and B color image data stored in a memory 301 are respectively entered into D/A converters 305 through corresponding look-up tables RLUT 302, GLUT 303 and BLUT 304. The respective color image data are subjected to digital-to-analog conversion in the D/A converters 305 and outputted to the monitor 110. For example, 8-bit R data output from the frame memory 301 is subjected to data conversion in the R data look-up table RLUT 302. As shown in FIG. 11, 8-bit input data 401 is inputted as an address signal for a look-up table 402 made from a ROM, and the corresponding stored data is outputted from the look-up table 402. The relation between the input and the output may be freely changed as shown as 403, 404, 405 and 406. The input addresses of the look-up table 402 are combined into banks each consisting of 256 addresses, and various kinds of data are stored in each bank. From among address inputs to the ROM (look-up table 402), higher-order addresses, e.g., the 9th- or 10th-bit address is changed to switch the banks. It is accordingly possible to change the output with respect to the same input.

In FIG. 10, an LUT bank select signal 308, which is transferred from the CPUB 101 over the system bus 111, is inputted to an LUT bank selector 307. The LUT bank selector 307 independently switches the banks of the respective tables RLUT 302, GLUT 303 and BLUT 304 in accordance with the signal 308.

In this manner, the user can change the color tone of the image displayed on the monitor. For example, the use may give the CPUB 101 a command to that effect by operating the mouse 118 or the like. Upon receipt of the command, the CPUB 101 outputs a signal for switching the banks of the look-up tables RLUT 302, GLUT 303 and BLUT 304.

As is apparent from the foregoing, since the characteristics of the look-up table which is used to alter color tone is switched without the need to directly alter an image data, it is possible to alter the color tone of the image at high speed.

Although the above explanation refers to the arrangement in which the color tone of an image is altered by switching the banks, the present invention is not limited to such arrangement. For example, a RAM of an 8-bit input and 9-bit output RAM such as that shown in FIG. 8 may be employed as an R component look-up table. That is to say, the CPUB 101 can freely rewrite the conversion characteristics of the look-up table to alter color tone.

Detailed explanation will be given below in conjunction with FIGS. 12 and 13.

Although the following explanation refers to 8-bit R data, G data and B data are also handled in substantially the same manner. Image data FDAT 805 output from the frame memory FM/DA 107 is selected by a selector 801 and outputted to a data line 807. Then, the image data is inputted to an R data look-up table RLUT 802, where it is subjected to data conversion. The resulting signal is transferred as a video output 808 to the monitor 110, the printer means 2 or other systems.

The following is an explanation of a method of rewriting the data of the RAM of the look-up table RLUT 802.

Figure 12:
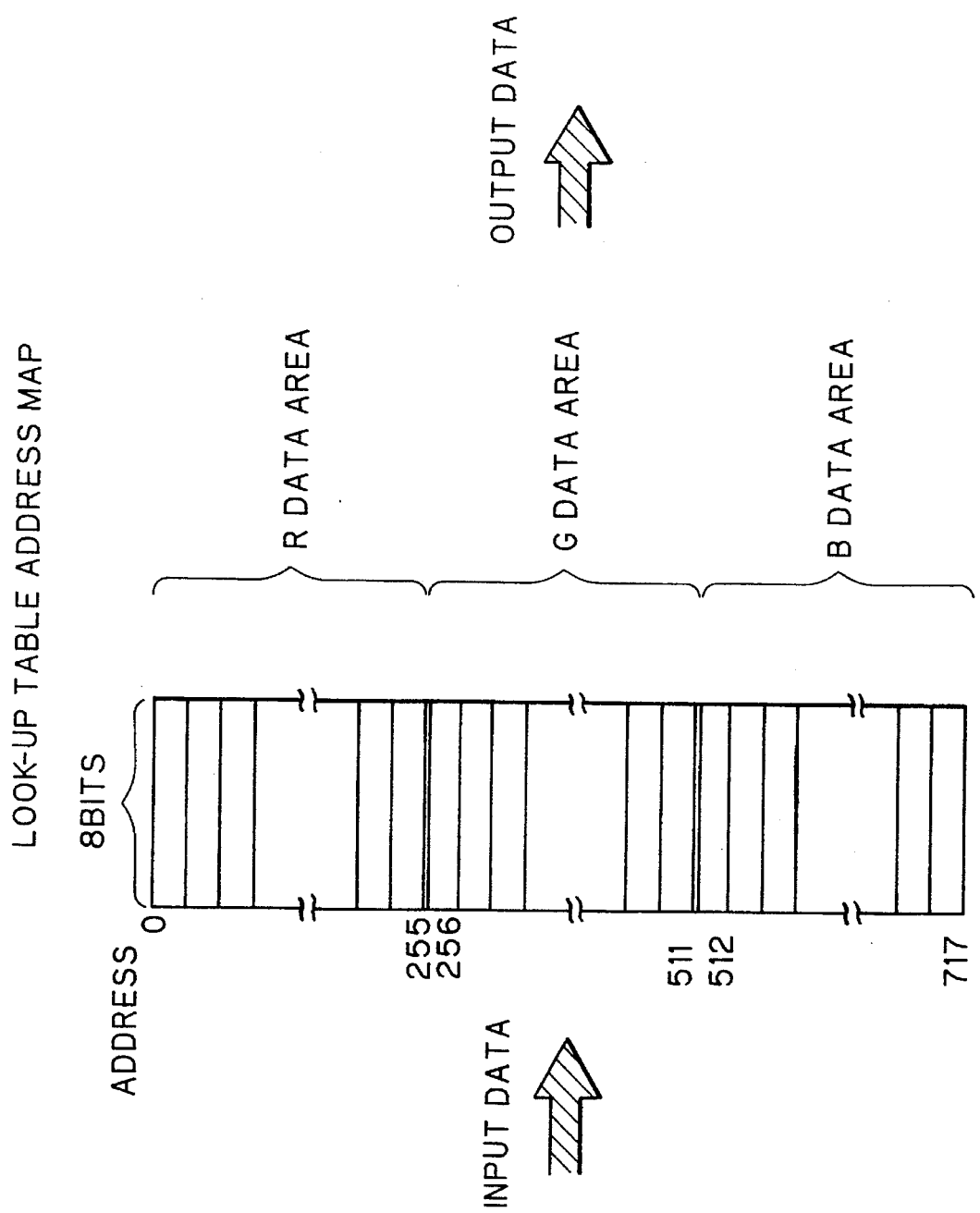
FIG. 12 is a view showing the address map of the look-up table as viewed from a CPU.
Figure 13:
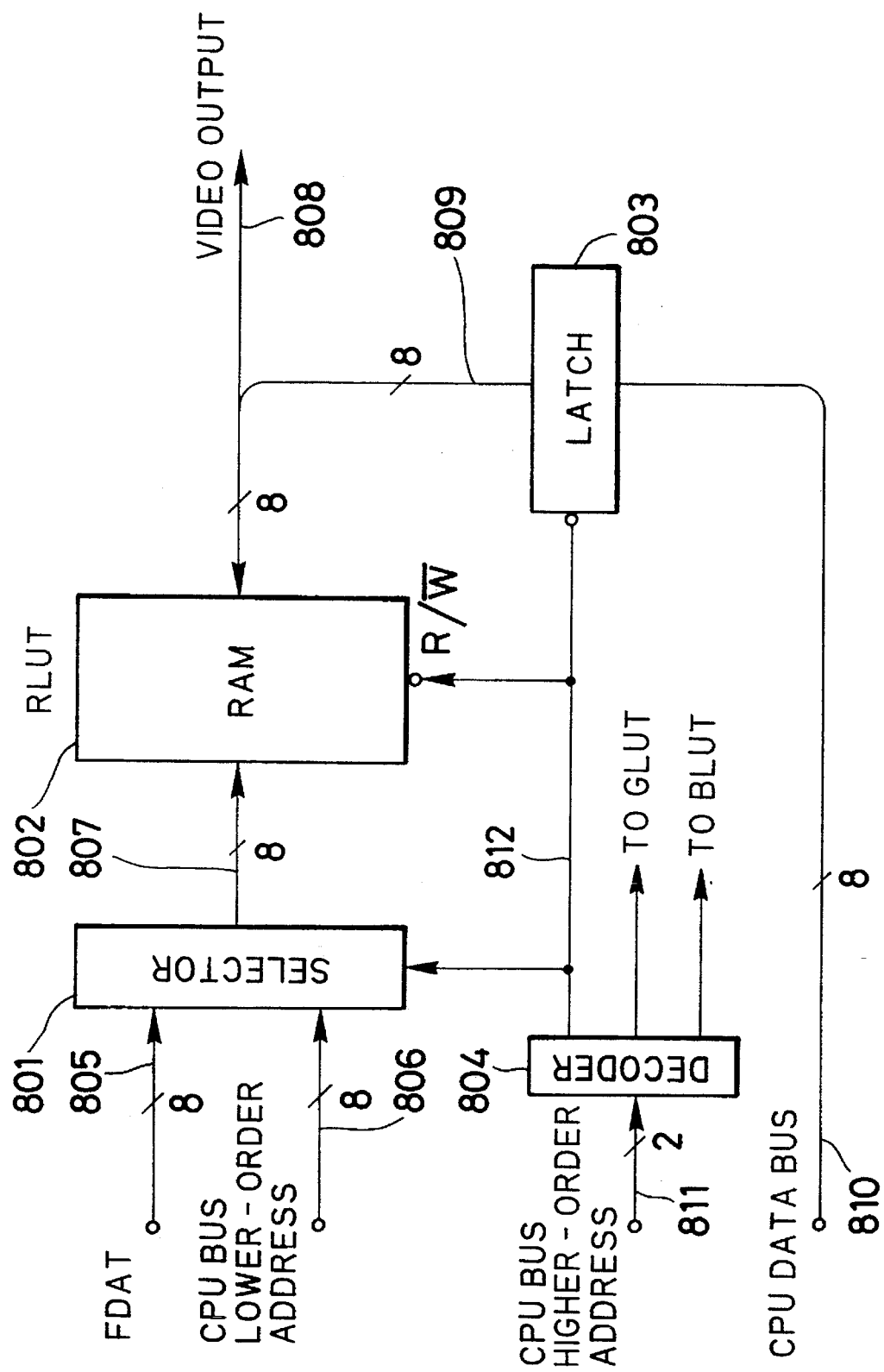
FIG. 13 is a block diagram showing an example of a circuit arrangement in which a look-up table for altering color tone is made from a RAM.

The memory space of the look-up tables R, G and B as viewed from the CPUB 101 is mapped as shown in FIG. 12. More specifically, addresses 0 to 255 are assigned to an R data area, addresses 256 to 511 a G data area, and addresses 512 to 717 a B data area. It is assumed that, for example, the data at address 128 in the look-up table RLUT 802 is 50. This means that, if R data indicating 128 enters the frame memory FM/DA 107, the RLUT 802 converts the R data into data indicating 50. If it is desired to rewrite the data at address 128 as 200, the CPUB 101 outputs address 128 to an address bus including a CPU bus higher-order address 811 and a CPU bus lower-order address 806. In this case, 2 bits of the CPU bus higher-order address 811 are "00" and 8 bits of the CPU bus lower-order address are "01000000". A decoder 804 makes a decision as to 2 bits of the CPU bus higher-order address to set a signal line 812 to a high-level state, to cause the selector 801 to output the CPUB bus lower-order address 806 as a selector output 807, thereby accessing address 128 in the look-up table RLUT 802. The signal line 812 also leads to the look-up table RLUT 802 and, since the signal line 812 is in a high-level state, the RAM of the RLUT 802 is set to a write-enable state. Simultaneously, new data 200 is outputted to a data bus 810 from the CPUB 101 and, since the signal line 812 is in the high-level state, a latch 803 is set to an enable state to allow the data indicating 200 to be written to the look-up table RLUT 802 over a data line 809.

In the above-described manner, it is possible to convert the data in the look-up table RLUT 802. Data conversion for the look-up tables GLUT and BLUT is also performed in substantially the same manner.

As described above, each look-up table is made from a RAM, and color conversion is performed by rewriting data from CPU without using bank switching.

Although the above explanation refers to color adjustment, an image size or position which is similarly adjusted on the monitor may be added to the output.

Although the above-described embodiment has been used on the transmission and reception sides of an image communication system as a image processing system, the present invention may, of course, be applied to an ordinary color copying machine as a mechanism for adjusting color, size and position.

When an original image is displayed, a red image (R data) is initially displayed and a synthesized color image consisting of R and G data is then displayed, with the result that a clear image may not be displayed. To obviate this problem, in the intermediate process where the R image and the synthesized image of the R and G data are displayed, the image may be displayed as a monochrome image.

Figure 14:
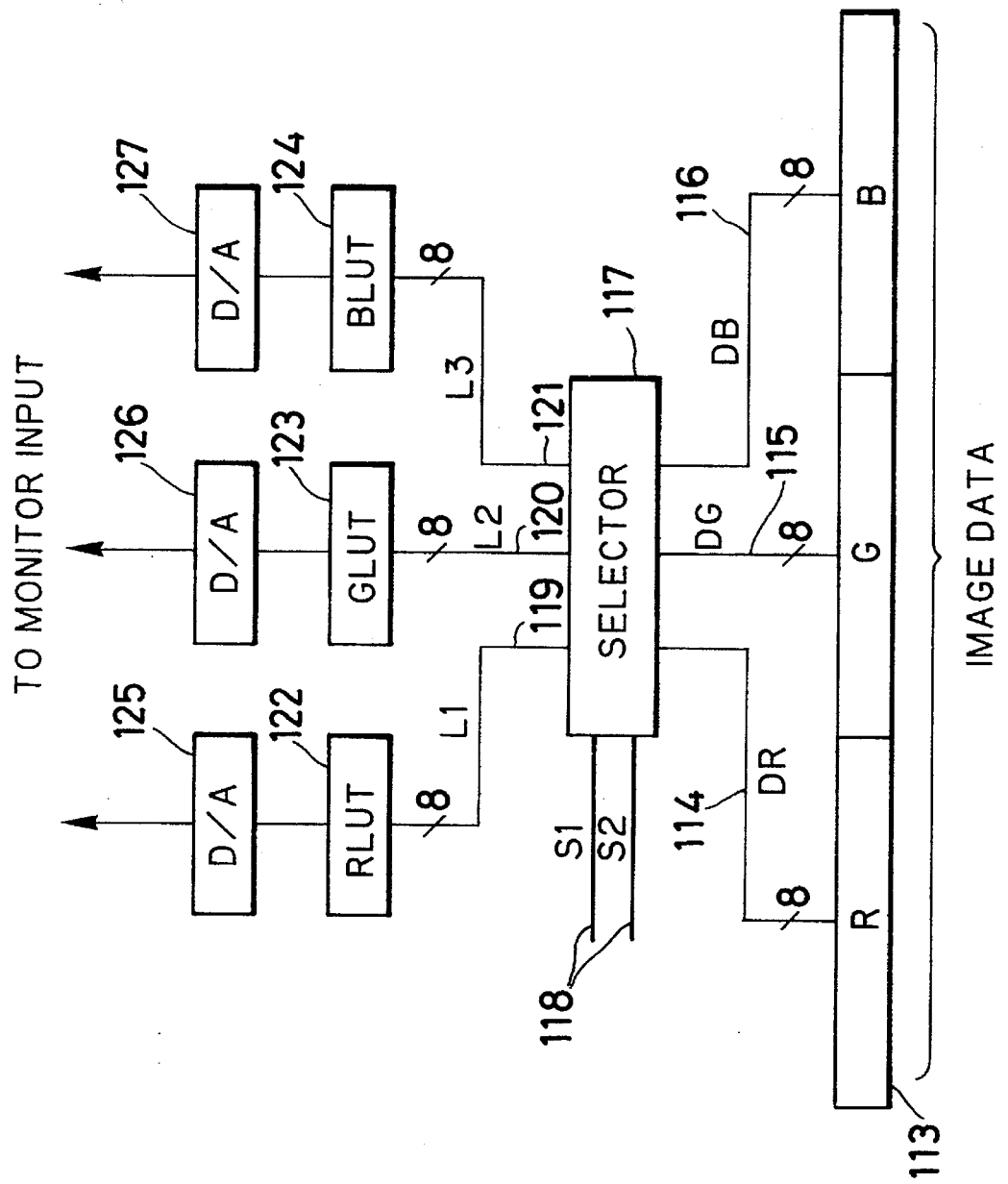
FIG. 14 is a block diagram showing the input signal processing section of a monitor.

FIG. 14 shows the modified circuit arrangement of the frame memory FM/DA 107 which enables a monochrome image to be produced in an intermediate process.

In the arrangement in which an image from the frame memory FM/DA 107 is displayed on the monitor 110, as shown, a selector 117 is disposed between the image data 113 from a frame memory (not shown) and the R, G and B look-up tables RLUT 122, GLUT 123 and BLUT 124. R, G and B color image data are inputted to R, G and B input signal lines DT 114, DG 115 and DG 116 through the selector 117 and selectively outputted to corresponding output signal lines 122, 123 and 124 in accordance with a select signal 118. The data output from the selector 117 selectively enters the R data look-up table RLUT, the G data look-up table GLUT and the B data look-up table BLUT. After the completion of data conversion, the image data is converted into analog data in a corresponding D/A converter 125, 126 or 127, and supplied to the monitor 110 for display purposes.

The select signal 118 is changed as shown in the table of FIG. 15 by triggering the DMA transfer of R, G and B. By changing the input and output in accordance with the select signal 118 as shown in the drawing, a monochrome image is displayed in each of the first and second display cycles and a full color image is displayed in the third display cycle.

If it is assumed that R data is being read into the frame memory FM/DA 107, each select signal S1 and S2 is a 0 and the selector 117 selects the input signal line DT 114 to output the R data to the RLUT 122, the GLUT 123 and the BLUT 124. Since data on the respective R, B and B components are the same, a monochrome image is displayed on the monitor 110. As shown in the table of FIG. 15, while G data is being written to the frame memory FM/DA 107, only the G component data is outputted to each look-up table. Alternatively, the value of the G data may be compared with that of R data which has been previously written and the data having a greater value may be outputted.

In addition, it is apparent that various forms of visual display can be achieved by changing the contents of the input/output table of FIG. 15.

As is apparent from the foregoing, it is possible to improve the clearness of a visual display by providing the selector between the frame memory and the look-up tables.

As described above, it is possible to transfer (transmit) an image through the communication circuit 109 while confirming the image displayed on the monitor 110 in real time or after confirming it.

When an image is received through the communication circuit 109, the communication circuit 109 writes the received image data to corresponding addresses in the page memories PMR 102, PMG 103 and PMB 104 by means of direct memory access.

The DMA controller (DMAC) 106 will now be explained in more detail.

Figure 16:
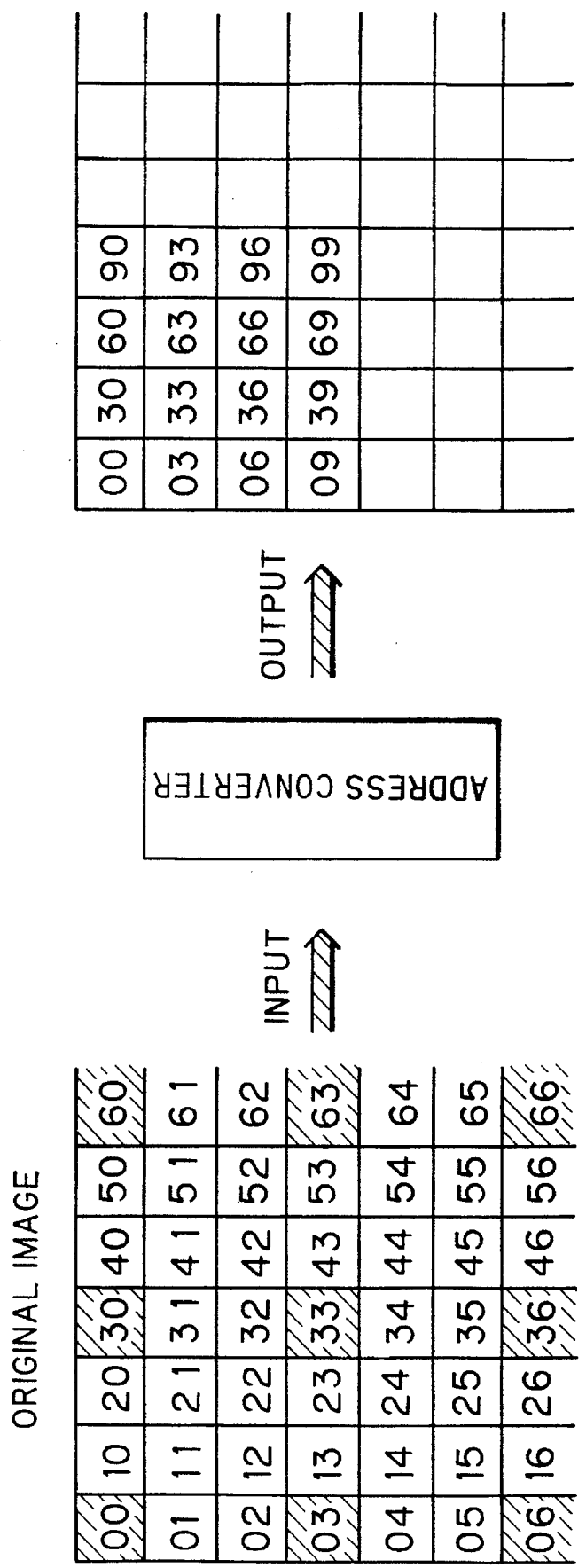
FIG. 16 is a schematic view which serves to illustrate an image reducing process.

As described previously, the DMAC 106 has an address converting function such as that shown in FIG. 16 for the purpose of changing magnifications. For example, when an original image is reduced to a size one-third full, the original image is omitted at the proportion of two pixels for three pixels in the vertical and horizontal directions, thus preparing an output image. Although details will be explained later, an address generator disposed in the DMAC 106 reads the images stored in the page memories PMR 102, PMG 103 and PMB 104 while skipping two addresses for three addresses. The DMAC 106 fetches the resulting image data and writes it into predetermined address positions in the memory disposed in the frame memory FM/DA 107. The omitting intervals for omitting pixels can be arbitrarily set in a readout step number register (corresponding to a reduction register which will be described later).

For example, if the number "6.7" is set in the readout step number register and the readout start address of the page memory PMR 102 is 100, the aforesaid address generator initially generates address 100 and the corresponding data is read from the page memory PMR 102 into the frame memory 107. Then, the address generator uses an internal adder to add "6.7" to address 100, thereby generating a corresponding address. In practice, the decimal portion is omitted and address 106 is generated. Then, flap number 6.7 is added to address 6.7 so that address 113.4 is generated (in practice, the data at address 113 is read out). When one horizontal line of image data of the page memory is processed, a readout start address for the next line is set and the above-described process is repeated until a readout completion address is reached. In this manner, the number of pixels of the original image is reduced to 1/6.7—approximately 15%. It is also apparent that, by arbitrarily setting the readout start address and the readout completion address, an arbitrary rectangular region can be reduced for DMA purposes.

Figure 17:
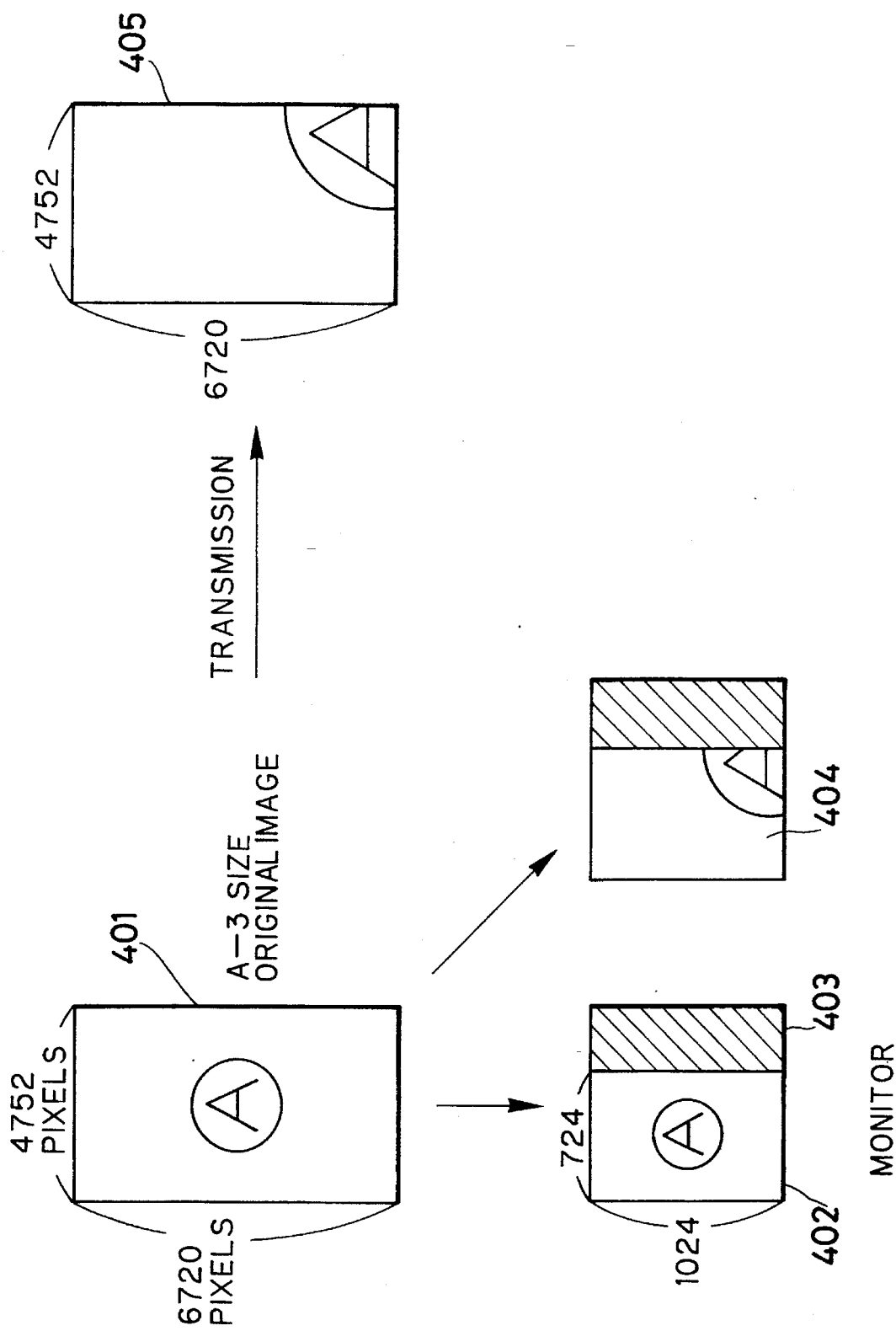
FIG. 17 is a schematic view showing the relationship between an image displayed on a monitor screen and an image to be transmitted.

For example, it is assumed that, as shown in FIG. 17, the original image 401 has a width of 4752 pixels and a length of 6720 pixels and an A3-size hardcopy output is produced from the original image 401. If the original image 401 is to be enlarged to a two-fold size and transferred to a destination system, it is desirable to check how the image is transferred on a monitor on the transmission side. This checking is performed as follows. The resolution of the monitor 110 is generally low, for example, 1024 pixels×1024 pixels in total. On the display screen, its left-hand area (724 pixels wide× 1024 pixels long) is assumed to correspond to an A3 size output sheet. More specifically, the original image from each of the page memories PMR 102, PMG 103 and PMB 104 is reduced to 1/6.56 through the DMAC 106 to the monitor frame memory FM/DA 107. Thus, the whole original image of full size is displayed on the monitor.

When an original image 401 is to be transferred in a twofold scale, an area which occupies 2376 pixels×3360 pixels (origin: upper-left corner) in the original image 401 is reduced to 1/3.28 and is transferred to the frame memory FM/DA 107 through the DMAC 106 by DMA transfer. As shown at 404 in FIG. 17, image data to be received in an enlarge scale can be confirmed on the transmission side.

Although the above explanation refers to only the reduction of an image since the resolution of the monitor is low compared to that of a typical hard copy device, enlargement is also controlled in a similar manner.

For example, a case where an image is transferred to a destination system will be considered. Since the above explanation applied to reduction processing, explanation thereof is omitted. In this case, the communication circuit 108 shown in FIG. 1 or 6 performs communication and is provided with an address converter such as that shown in FIG. 18. For transmission of an enlarged image, the same pixels are repeatedly read out; for example, when an image of threefold size is to be transferred, the same addresses of the original image may be transferred three times.

In this manner, as shown at 405 in FIG. 17, an image of twofold size can be transferred to the page memories of the destination system. In other words, it is possible to confirm an image to be transferred to the page memories in a system on the reception side through the image displayed on a system on the transmission side.

Although an A3-size original image has been used for the purpose of illustration only, the above arrangement may be applied to another size image such as an A4-size image. For example, when a command to cause the scanner to start a scanning operation is given to the system, the size of an original to be read is specified at the same time. In accordance with the specified size, the scanner 1 scans the original image and the read image is stored in the page memories 102, 103 and 104. The CPUB 101 calculates the omission ratio required to display the original image over the entire display screen on the basis of the specified original size, and sets the calculated value in the DMAC 106. In the shown example, since the number of dots which can be displayed on the display screen is 1024 pixels in either of the vertical and horizontal directions, the omission ratio can be obtained by dividing 1024 by the number of dots arranged along the long side of the original to be read out. The image thus displayed is a reference image. If a transmission command is given when the reference image is displayed, the read image is directly transferred to the destination system. If the reference image is displayed in a twofold scale, a partial image which is actually displayed on the display screen is transferred. That is, the magnification of the image to be transferred corresponds to that of the reference image.

FIG. 16 shows the circuit arrangement of the DMAC 106.

The DMAC 106 has a register group 121 into which the CPUB 101 writes operating conditions. Desired data can be written to each register of the register group 121 through an address decoder 133 and a data buffer 134 connected to the system bus 111. The register group 121 includes an address register 212 provided for determining a write start position in the memory of the frame memory FM/DA 107; an address register 211 provided for determining a read start address in the page memories PMR 102, PMG 103 and PMB 104; a reduction-ratio register provided for setting the value R of a reduction ratio (I/R) when transferring image data from the page memories PMR 102, PMG 103 and PMB 104 to the frame memory FM/DA 107; a transfer number register for setting how number horizontal pixels are written from the addresses of the address register 212 to the frame memory FM/DA 107; a data register provided for forcibly changing data to be written to the FM/DA 107 into a set value; and a DMA mode register provided for setting the mode of DMA. The reduction ratio register corresponds to the step number register described above.

Three DMA modes are provided. In the first mode, image data is transferred from the page memories PMR 102, PMG 103 and PMB 104 to the frame memory FM/DA 107. In the second mode, the data set in the data register in the register group 121 is written to the frame memory FM/DA 107. In the third mode, the contents of a data ROM 122 are written to the frame memory FM/DA 107.

The first mode will now be explained.

Each of the page memories PMR 102, PMG 103 and PMB 104 has a memory capacity for one page, and the (low-order) addresses other than high-order addresses assigned to each of the pages memories are mapped in the same manner. In an initial state, the contents of the address register 211, that is, readout start address information, are selected by the selector 129 and latched by a latch 130.

The readout start address is supplied to an address line through a multiplexer 128. The data which is read from the page memory PMR 102 in accordance with that address is latched by DL1 of a data latch 126 DL1 connected to a data line. A control circuit 132 sequentially controls the page memories PMR 102, PMG 103 and PMB 104 to substitute high-order addresses. Thus, G data is read from the page memory PMG 103 and latched by a data latch 126 DL2. Similarly, B data read from the page memory PMB 104 is latched by a data latch 126 DL3. A decoder 125 decodes the above high-order addresses generated by the control circuit 132 to generate latch-enable signals for the data latches 126 DL1–DL3.

A data latch 126 DL4 operates similarly to the latches 126, DL1, DL2 and DL3 only when an image signal carries four colors (e.g., Y, M, C and Bk) and page memories for four colors are provided.

The data of the address register 212, that is, the write start address, is set in the address counter 124 in advance. This address is selected by the multiplexer 128 and supplied to the address bus, while the contents of the data latches 126 DL1–DL3 are supplied to the data bus by the multiplexer MPX 127. The data thus read is written to the frame memory FM/DA 107. Through the above operation, the first pixels from the data from the respective three page memories are synthesized on the frame memory FM/DA 107. In the synthesis of the second pixels, since the value R of the reduction ratio register is added to the output of the latch 130 in an adder 13 and the sum is supplied to the latch 130 through the selector 129, the latch 130 newly latches the SUM.

The address counter 124 counts up one by one to repeat the same operation as it did in the synthesis of the first pixels. Subsequently, the address counter 124 repeats the same operation. The data of the transfer number register is set in a down counter 135 and, each time one pixel is processed, the down counter 135 counts down by one. When the count value reaches "0", an interruptor 136 outputs to the CPUB 101 an interrupt signal indicating that the process of transferring one horizontal line of data has been completed.

This completes the DMA operation. The interruptor requests the CPU board CPUB 101 to set in the address registers 211 and 212 the data required to process the next horizontal line. By repeating the above-described DMA operation, DMA transfer of, e.g., a rectangular area can be accomplished.

In the second mode, part of the operations performed in the first mode are omitted. The operation of reading images from the PMR 102, the PMG 103 and the PMB 104 is skipped. The multiplexer 127 selects not the contents of any of the data latches 126 DL1–DL4 but the contents of the data register of the register group 121 and supplies them to the data line.

In this operation, one horizontal line of image data is written with a predetermined image data value (the value of the data register) through DMA (direct memory access) with respect to the width represented by the value which has been set in the transfer number register. This operation is repeated over a number of lines which continue in the vertical direction, whereby, for example, a rectangular area can be filled with certain values. If this function is utilized to clear the memory of the frame memory FM/DA 107, it is possible to clear the image displayed on the monitor 110.

In the third mode, image data, which is prepared as the contents of the data ROM 122 in advance, is converted into the individual colors R, G and B in the look-up table LUT 123. Character patterns and icon patterns are stored in the data ROM 122. In this case, since the data ROM 122 stores image data to be displayed, R=1 is normally set in the reduction ratio register. If R=0.5 is set, the ratio of alteration of magnification is 1/R=2, whereby twofold characters and icons are displayed.

The read start position in the data ROM 122 is set in the address register 211. The third mode differs from the second mode in that the multiplexer MPX 127 selects and outputs the data of the look-up table LUT 123 and in that the output from the latch 130 is supplied as addresses for the data ROM 122.

The latch 130 receives a clock identical to that applied to the address counter 124. Each time image data for one pixel is written to the board of the frame memory FM/DA 107, one clock is applied to the latch 130 and the data of the data ROM 122 which was converted by the LUT 123 is written to the pixel position in the frame memory FM/DA 107 (the output of the address counter 124) which is adjacent to the pixel which was immediately previously written thereto. Characters, character arrays and the horizontal width of an icon which are to be written to the frame memory FM/DA 107 are set to the transfer number register. Thus, when DMA processing for one line is completed, the interruptor 136 interrupts the operation of the CPU board CPUB 101 for the purpose of completing the DMA processing. The CPU of the CPUB 101 determines DMA settings for the next line of one-pixel width in order to set characters, a character array, an icon and the like. The CPU repeats such DMA request by the number of times corresponding to the number of horizontal lines which represent characters, character arrays and icons to be written by the DMA processing. In this manner, the desired characters, character arrays or icons can be written to the frame memory FM/DA 107 at high speed.

If the characters which are finally synthesized (substituted) in an image by the aforesaid processes are appropriate, the user inputs a command to that effect into the system. Then, the process of developing in each page memory character patterns derived from a font memory (not shown) is performed so that an image identical to that displayed on the display screen can be produced.

Figure 19:
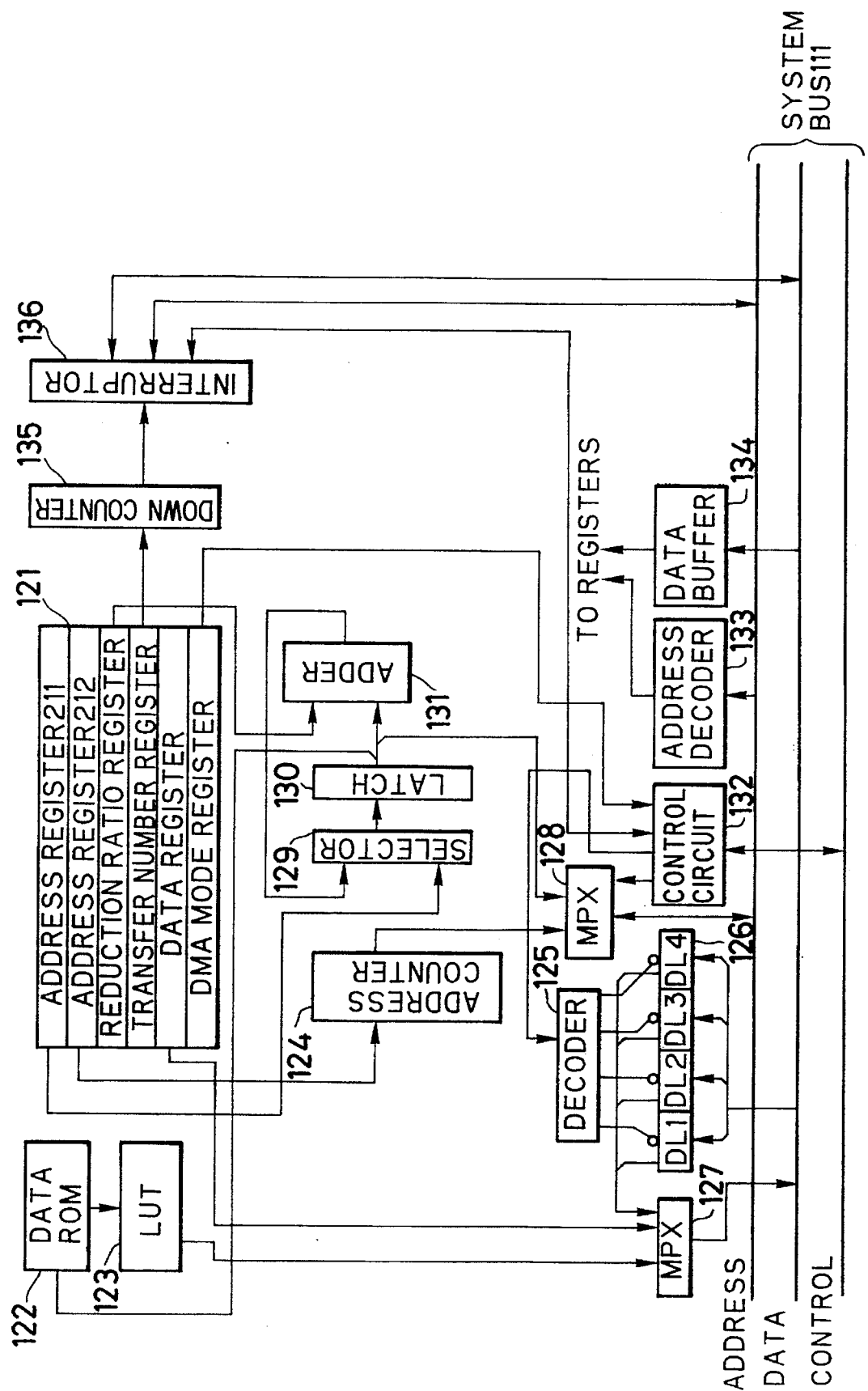
FIG. 19 is a block diagram showing the arrangement of a direct memory access controller according to each of the embodiments.
Figure 20:
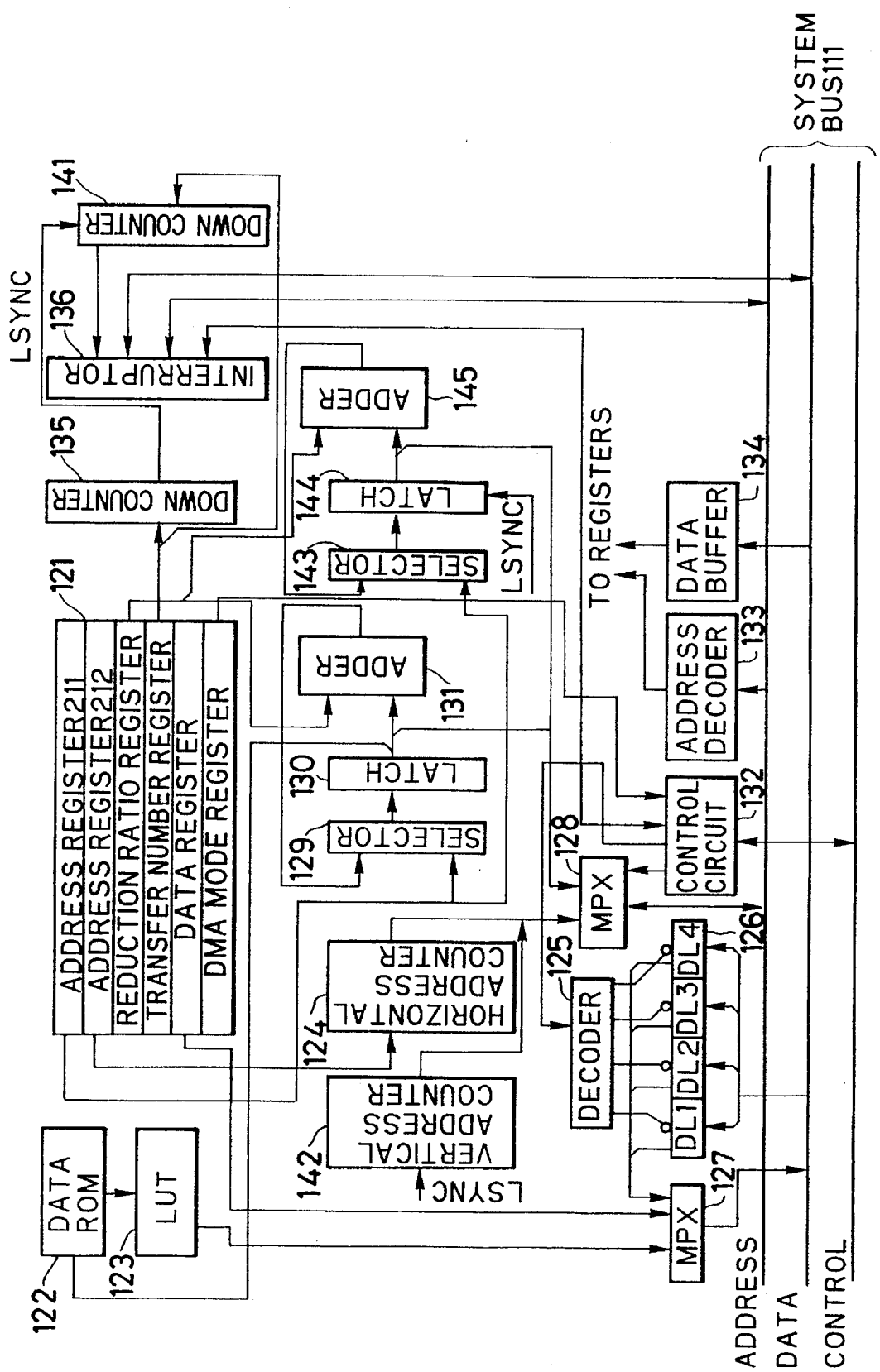
FIG. 20 is a block diagram showing the arrangement of another direct memory access controller.

If the above-described DMAC for handling image data in line-by-line fashion is utilized to apply DMA processing to a trapezoid- or lozenge-shaped image, it will be necessary to insert the processing by the CPUB 101 between every line as explained in conjunction with FIG. 19. In contrast, if the DMAC is constructed as shown in FIG. 20, it is unnecessary to insert the processing by the CPUB 101 in the middle of the DMA processing of a rectangular area.

Elements which differ from those shown in FIG. 19 will be explained below.

The number of pixels which are vertically arranged in the rectangular area written to the frame memory FM/DA 107 is set in the transfer number register of the register group 121 in addition to the number of pixels which are arranged horizontally. The number of pixels in the vertical direction is initially set in a down counter 141. Each time DMA for one line in the rectangular area is completed, a down counter 135 generates a synchronizing signal LSYNC indicating the completion of the DMA of one line, and the down counter 141 is made to count down by one. Read start addresses with which reading from the respective page memories PMR 102, PMG 103 and PMB 104 through DMA is started, are set in the address register 211. Vertical and horizontal components, which are thus derived from the transfer number register, are set in the latch 144 through the selector 143 immediately before the start of DMA. The horizontal component is also set in the latch 130 through the selector 129. This horizontal component is reset again and again in synchronization with the synchronizig signal LSYNC.

The synchronizing signal LSYNC is supplied to the latch 144 and, each time DMA for one line is completed, an adder 145 adds the value R of the reduction ratio register to a vertical address. The sum is latched by the latch 144 through the selector 143.

The output from the latch 130 which indicates a horizontal address and the output from the latch 144 which indicates the vertical address are supplied to the page memories PMR 102, PMG 103 and PMB 104 or the data ROM 122 through the multiplexer MPX 128.

If those address outputs are to be supplied to the data ROM 122 so that data such as a character array is transferred to the frame memory FM/DA 107, R=1 is normally selected. If R=0.5 is selected, the image is enlarged at a magnification of 2×. In this case, the addresses supplied to the data ROM 122 include only bits in the integer part of the output from each of the latches 130 and 144.

By processing and displaying a read image in the above-described manner, it is possible to quickly check a fine portion in an enlarged scale or check the balance of the entire area, and also to add reference data by synthesis in aid of understanding. Accordingly, it is possible to remarkably advantageously grasp image data in an intermediate process.

Explanation of Outputting of Image Data

When a hard copy is to be produced from image data stored in the page memories PMR 102, PMG 103 and PMB 104 (data read through a scanner or data received from another system), the image data is transferred to the color printer means 2 through the scanner/printer interface SPI/F 105. Since the SPI/F 105 includes no page buffer, the image is transferred from the page memories PMR 102, PMG 103 and PMB 104 to the color printer means 2 in real time. In this operation, the transfer of image signals between the the page memories PMR 102, PMG 103 and PMB 104 and the SPI/F 105 is conducted by means of the high-speed bus 112. The SPI/F 105 outputs the color component of a character of a printer 2 as a control signal for the high-speed bus 112. Each board of the page memories PMR 102, PMG 103 and PMB 104 determines whether it is selected on the basis of the control signal. If it is selected, the board provides an image output for each horizontal raster in synchronization with a synchronizing signal output from the SPI/F 105.

Figure 18:
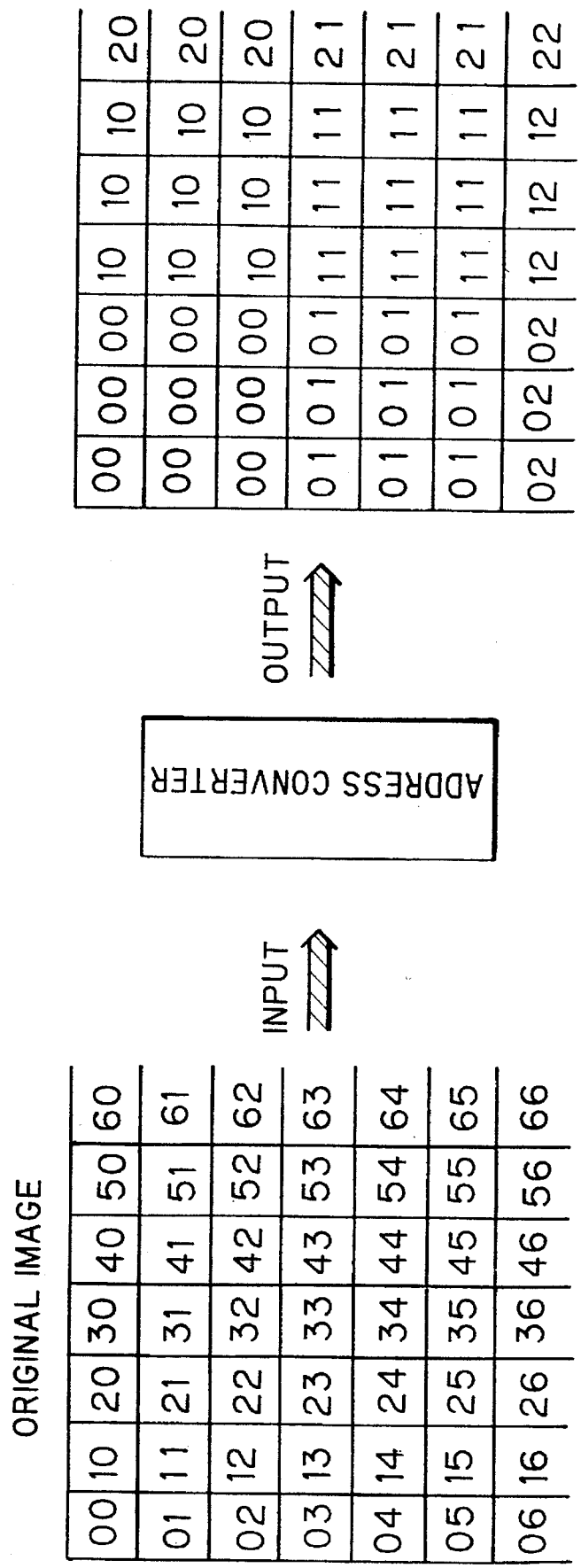
FIG. 18 is a schematic view which serves to illustrate an image enlarging process.

The SPI/F 105 of the embodiment has a magnification altering mechanism controllable by the CPUB 101 (corresponding to the address converting section shown in each of FIGS. 16 and 18), similarly to the DMAC 106 described previously. Accordingly, an image can be produced at a reduction or magnification ratio which is specified by the user. Since the magnification altering mechanism is substantially the same as that of the DMAC 106, no explanation is given.

A certain problem may be encountered when the user changes the color tone of the image displayed on the monitor 110 through the above-described processes and then obtains a printout from the printer 2. Specifically, since the image displayed on the display screen differs from the image actually stored in the page memories PMR 102, PMG 103 and PMB 104, an image whose color tone has not yet been altered will be printed out.

Figure 21:
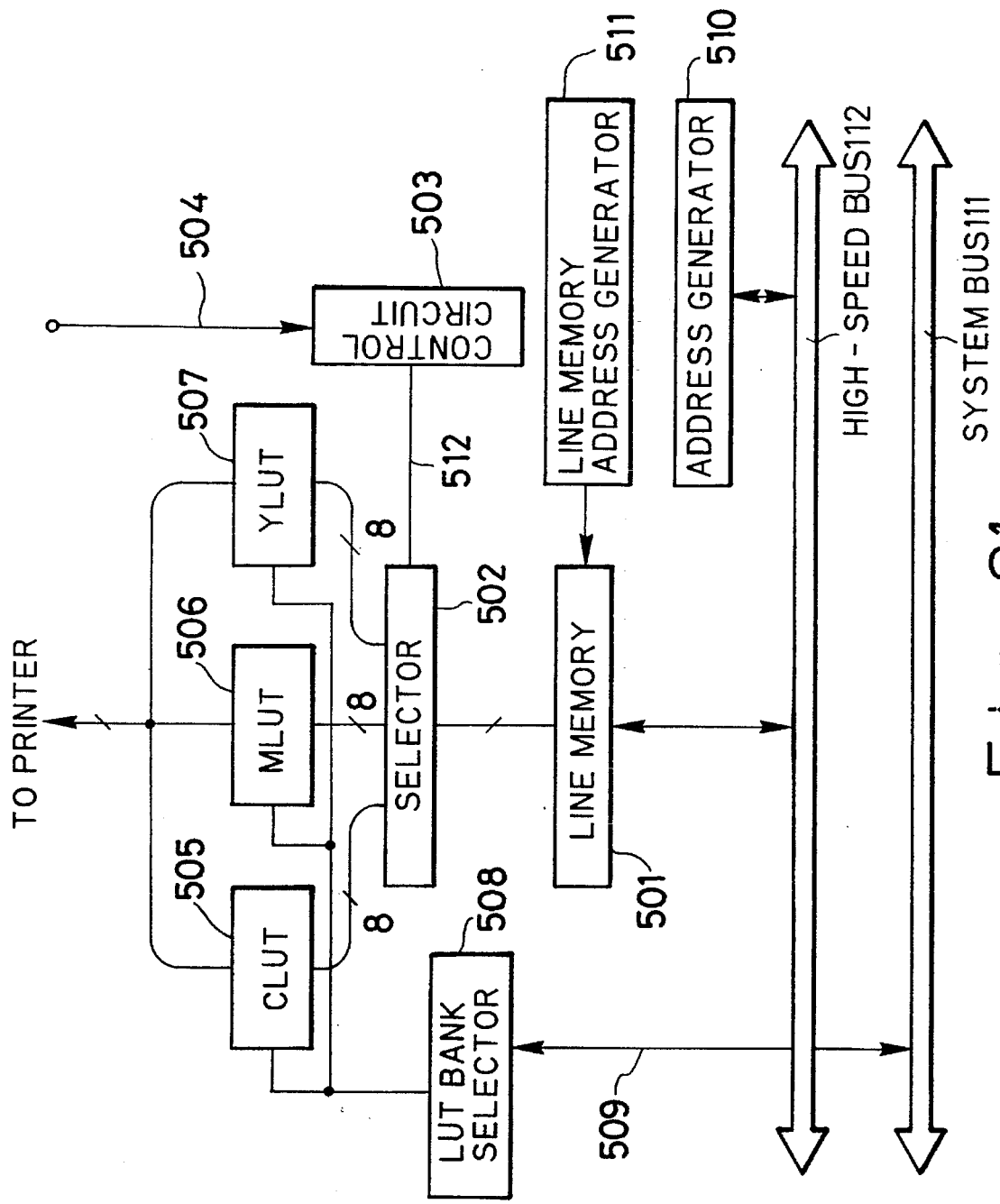
FIG. 21 is a block diagram showing an example of a circuit for adjusting the color tone of an image to be printed out.

To avoid such a problem, dedicated look-up tables CLUT 505, MLUT 506 and YLUT 507 for printer outputs are provided in the scanner/printer interface SPI/F 105 as shown in FIG. 21. As the monitor 110 provides a display, the CPUB 101 switches the bank of the look-up tables CLUT 505, MLUT 506 and YLUT 507 for printer outputs with reference to the data of the look-up tables RLUT 302, GLUT 303 and BLUT 304 of FIG. 10 and in accordance with a bank switching signal, whereby the displayed image is made to correspond to a hardcopy.

In accordance with the address generated by an address generator 510, image data is supplied from the page memories PMR 102, PMG 103 and PMB 104 to a line memory 501 in the scanner/printer interface SPI/F 105 over the high-speed bus 112 in a frame-sequential manner. A selector 502 selectively supplies the image data stored in the line memory 501 to the look-up tables CLUT 505, MLUT 506 and YLUT 507. R data is supplied to the CLUT 505, G data the MLUT 506, and B data the YLUT 507. The respective data are converted into data matching the characteristics of the printer 2, and are outputted thereto as cyan data, magenta data and yellow data. In this case, UCR (under color removal) processing is, of course, performed.

Bank switching of the look-up tables is controlled by an LUT bank selector 508 in accordance with an LUT bank select signal 509.

A look-up table select signal 512 indicating a look-table to which the image data is to be supplied from the line memory 501, is outputted from a control circuit 503 in accordance with a print signal 504 output from the printer 2. The selector 502 selects the specified look-up table in response to the look-up select signal 512. The image data thus produced is outputted from the printer 2.

Explanation of Communication of Image Data

In FIG. 6, if a user at the system A on the transmission side alters the color tone of an image on the monitor 110 and transmits the image to the system B on the reception side, an image having a different color tone may be outputted to the monitor or printer of the system B because the color tones of the data of the the page memories PMR 102, PMG 103 and PMB 104 of the system A are not altered. For this reason, the look-up tables used in the monitor frame memory FM/DA 107 may be provided at the output stage of the page memories. The RLUT 302 is provided at the output stage of the PMR 102, the GLUT 303 at the output stage of the PMG 103, and the BLUT 304 at the output stage of the PMB 104. The bank of the LUT in each page memory is switched with reference to the bank of an LUT selected in the FM/DA 107.

In this manner, the image displayed on the monitor 110 of the system A is made identical to the image stored in the page memories PMR 102', PMG 103' and PMB' 104 of the system B.

By providing the above-described LUT in the communication circuit, it is, of course, possible to achieve similar advantages.

Figure 22A:
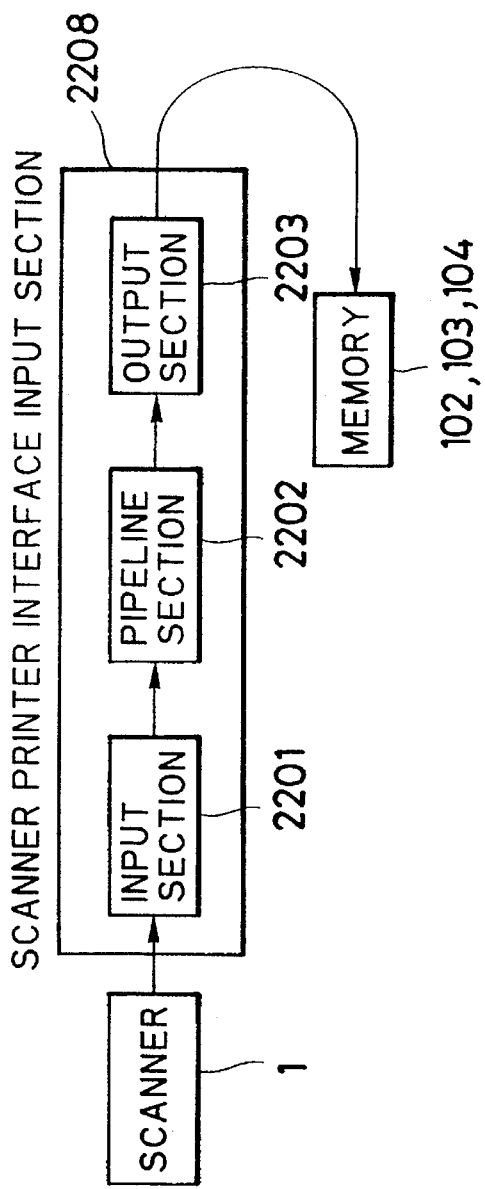
FIG. 22A is a schematic view showing a pipeline processing section for effecting pipeline processing of an image inputted from a scanner.

In the above embodiment, when the respective color component data read from the color scanner means 1 are to be stored in the page memories, gamma correction, color conversion, enlargement, reduction or the like may be applied to the data in the SPI/F 105. Particularly when the CPU is made to perform all such processings, processing speeds will be reduced. In the embodiment shown in FIG. 22, a pipeline processing section 2202 is provided in the input side of the SPI/F 105. In FIG. 22, an input section 2201, formed by a device such as a latch, is provided for inputting data to the pipeline processing section 2202. An output section 2203 is similarly formed.

Figure 22B:
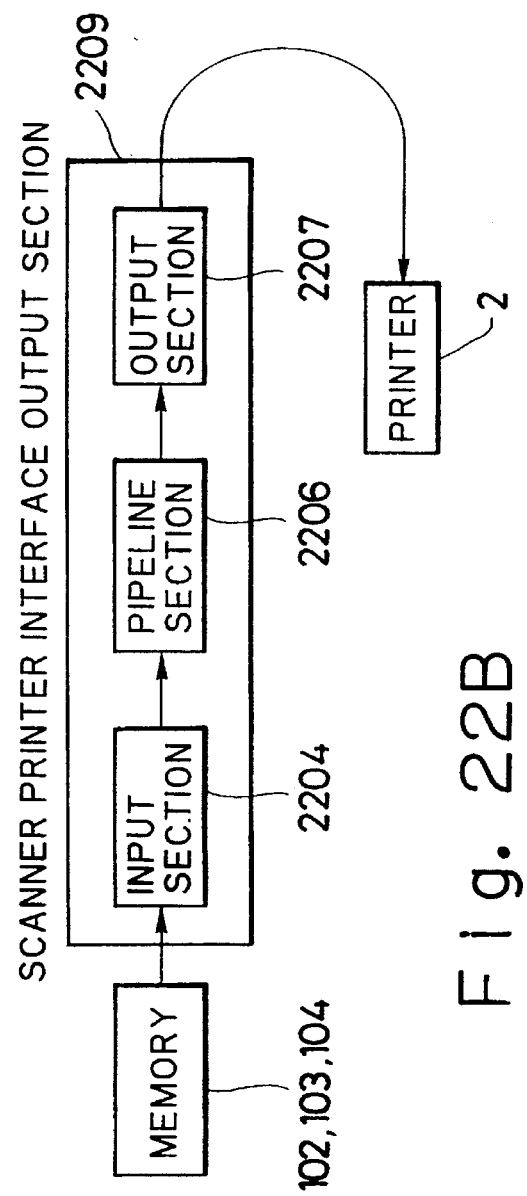
FIG. 22B is a schematic view showing a pipeline processing section for effecting pipeline processing of a memory output image to be outputted to a printer.

If the above-described pipeline processing is utilized to apply processing such as color correction to image data, it is possible to output the image data to the printer 1 at remarkably increased speeds. Accordingly, the pipeline processing section 2206 for effecting processing of similar kinds is preferably provided in the output section of the SPI/F 105 as shown in FIG. 22B. An input section 2204 is substantially the same as the input section 2201 and an output section 2207 is substantially the same as the output section 2203.

Figure 23:
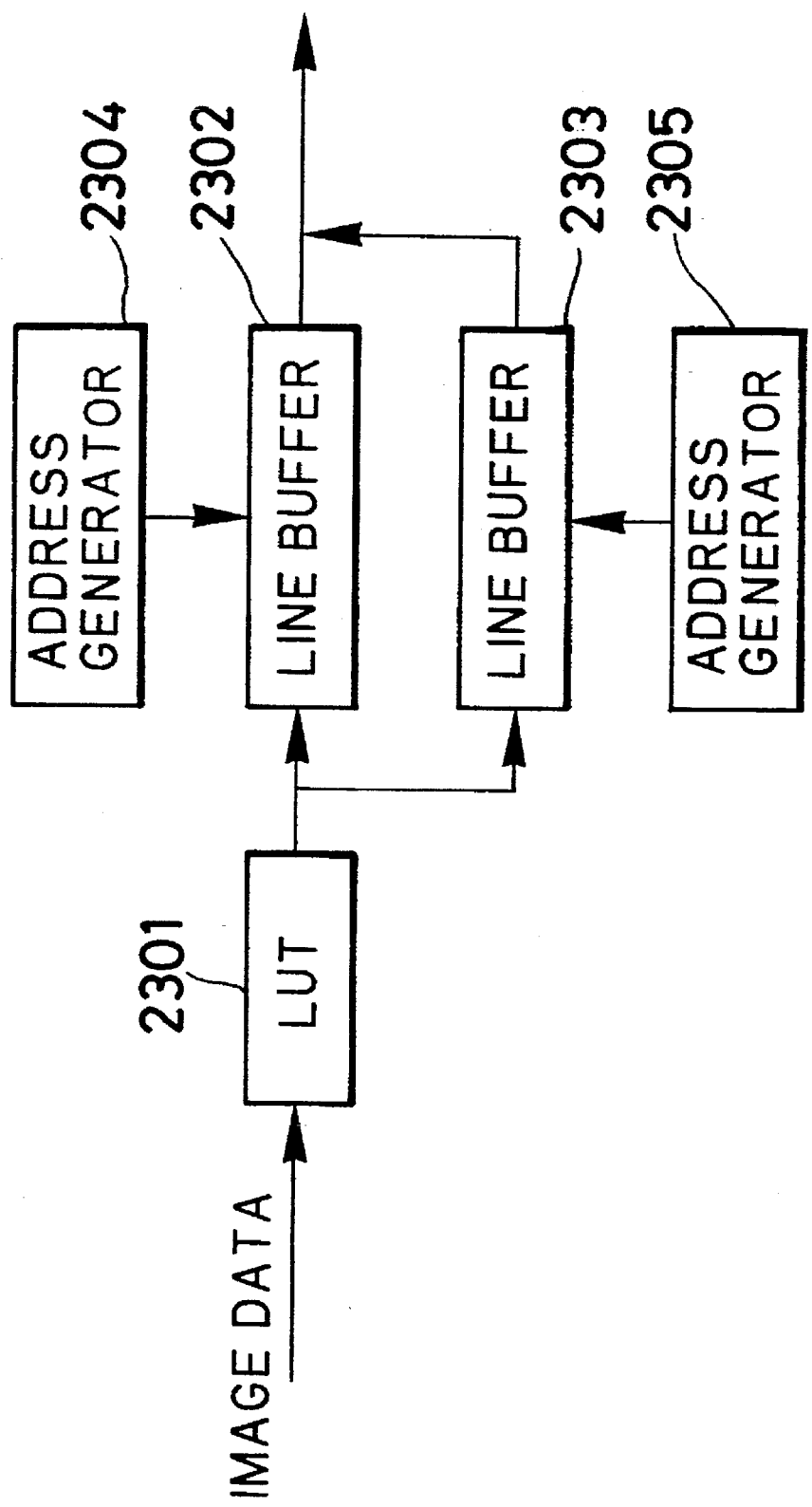
FIG. 23 is a schematic view showing the arrangement of the pipeline processing section.

FIG. 23 shows in more detail the pipeline processing section 2202 or 2206.

As illustrated, a look-up table 2301 is used to conduct predetermined processing such as gamma correction and color conversion. The converted image data is written to a line buffer 2302 or 2303 having a memory capacity of one horizontal line. When either of the line buffers 2302 and 2303 assumes a write mode, the other assumes a read mode. Each time data is written to the line buffer operating in the write mode, the write address of this line buffer is incremented by one. In the meantime, the line buffer operating in the read mode effects enlargement by repeatedly outputting image data at the same address or effects reduction by omitting image data at certain addresses. Address information for the line buffers 2302 and 2303 is generated by corresponding address generators 2304 and 2305 under the control of the CPUB 101. Since address generation is achieved by a combination of a latch for latching address information, a latch for latching the number of addresses to be omitted, an adder and the like as explained in conjunction with the DMAC 107, the principle of address generation is not explained.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing system arranged to read an original image and produce an image output on a recording medium, comprising:

reading means for color-sequentially reading out said original image as frame images for individual color components;

memory means for storing individual frame image information representing the frame images read by said reading means;

display means for displaying an image;

display memory means for storing an image to be displayed on said display means; and direct memory access control means for transferring said individual frame image information from said memory means to said display means frame by frame in a manner of direct memory access, said display memory means superimposes a frame image newly transferred from said memory means on a frame image stored in said display memory means each time one frame image is transferred, wherein the storing operation of storing frame image information for a color component in said memory means and the access operation of making access to frame image information for another color component by said direct memory access control means are performed in parallel.

2. An image processing system according to claim 1, further comprising communication means for transmitting and receiving information to and from destination communication system, said communication means including transmitting means for transmitting the image stored in said memory means to a destination system in a frame-sequential manner and receiving means for storing said images transmitted from said destination system in said frame-sequential manner in said memory means.

3. An image processing system according to claim 1, wherein said display means provides a single-color display until frame image information on all the color components is prepared.

4. An image processing system according to claim 1, wherein said direct memory access means further comprises magnification changing means for altering the image size of the image to be transferred.

5. An image processing system arranged to read an original image and produce an image output on a display unit, comprising:

reading means for sequentially reading out said original image as frame images for individual color components;

memory means for storing image data;

a first bus for connecting said reading means and said memory means;

writing means for writing said frame images read by said reading means to said memory means in a frame-sequential manner over said first bus;

display means for displaying an image;

display memory means for storing an image to be displayed on said display means; and a second bus for connecting said display memory means and said memory means;

a direct memory access control means provided at a position along said second bus, for transferring said frame image information from said memory means to said display memory means frame by frame in a manner of direct memory access, while said writing means is sequentially writing said read frame images to said memory means, wherein said display memory means superimposes a frame image newly transferred from said memory means on a frame image stored in said display memory means each time one frame image is transferred.

6. An image processing system according to claim 5, wherein said reading means reads said original image as images of individual color components, said memory means including independent image memories for storing said images of said individual color components.

7. An image processing system according to claim 6, wherein said writing means writes said image data on a particular color component read by said reading means to a corresponding image memory in said memory means, said controlling means being operative to control said direct memory access means to cause said direct memory access means to transfer to said display means said image data on said particular color component which has been written by said writing means.

8. An image processing system according to claim 7, wherein said display means provides a single-color display until image information on all the color components is prepared.

9. An image processing system according to claim 5, wherein said direct memory access control means includes magnification altering means for altering the image size of the image.

10. An image processing system according to claim 9, further comprising: output means for outputting said image information to a recording medium; and second controlling means for providing control to alter the image size carried by said image data stored in said memory means on the basis of the magnification-alteration information of said magnification altering means and to cause said output means to output said image data.

11. An image processing system according to claim 5, wherein said display memory means comprising; display memories for storing image data on said individual color components; and look-up tables for converting the image data on said individual color components read from said respective display memories into predetermined data values, respectively, and said display means comprising a display device for displaying color image on the basis of said individual color component data converted by said look-up tables.

12. An image processing system according to claim 11, further comprising altering means for altering the conversion characteristics of said respective look-up tables of said display memory means in accordance with the instruction of an operator.

13. An image processing system according to claim 12, further comprising output means for outputting image information to a recording medium and adjusting means for adjusting the color tone of said image data stored in said memory means on the basis of the conversion characteristics of said respective look-up tables altered by said altering means and causing said output means to output said image data.

14. An image processing system having image communication means capable of transmitting image information to a destination apparatus, comprising:

reading means for reading out an original image;

memory means for storing image information read by said reading means;

display means for displaying an image on a display screen;

first control means arranged to alter the size of an image carried by said image information stored in said memory means according to the size of said original image and output said image of altered size to said display means;

second control means for displaying a desired portion of a reference image at a desired magnification, said reference image being an image displayed under the control of said first control means; and transmitting means arranged to alter the size of the image carried by said image information stored in said memory means at said magnification controlled by said second control means and transmit said image information on said image of altered size to said destination apparatus.

15. An image processing system according to claim 14, wherein said first control means to alter the size of an image to display the whole read image on said display screen at a time.

16. An image processing system according to claim 14, wherein said display means comprises display memories for storing image data for individual color components, look-up tables for converting said image data for said color components read from said respective display memories into predetermined data values, and a display device for providing display on said display screen on the basis of said image data for individual color components converted by said respective look-up tables.

17. An image processing system according to claim 16, further comprising third control means for controllably altering the conversion characteristics of said respective look-up tables of said display means in accordance with an operator's command.

18. An image processing system according to claim 17, wherein said transmitting means includes adjusting means for adjusting and transmitting color tones, carried by said image data for said individual color components stored in said memory means, so that the image displayed under the control of said third control means is made coincide with said image to be transmitted to said destination apparatus.

19. An image processing system according to claim 18, wherein said adjusting means includes second look-up tables for converting said image data for said individual color components into predetermined data, and fourth control means for controlling said second look-up tables so that the conversion characteristics of said second look-up tables are made coincide with the conversion characteristics of said first look-up tables.

20. An image processing system having image communication means capable of receiving image information from a destination apparatus, comprising:

memory means for storing received image information;

display means for displaying an image on a display screen;

printing means for printing out said image information to a recording medium;

first control means arranged to alter the size of an image carried by said image information stored in said memory means according to the size of said original image and output said image of altered size to said display means;

second control means for displaying a desired portion of a reference image at a desired magnification, said reference image being an image displayed under the control of said first control means; and third control means arranged to alter the size of the image carried by said image information stored in said memory means at said magnification controlled by said second control means and produce a printout of said image of altered size by said printing means.

21. An image processing system according to claim 20, wherein said first control means to alter the size of an image to display the whole read image on said display screen at a time.

22. An image processing system according to claim 20, wherein said display means comprises display memories for storing image data for individual color components, look-up tables for converting said image data for said color components read from said respective display memories into predetermined data values, and a display device for providing display on said display screen on the basis of said image data for individual color components converted by said respective look-up tables.

23. An image processing system according to claim 22, further comprising fourth control means for controllably altering the conversion characteristics of said respective look-up tables of said display means in accordance with an operator's command.

24. An image processing system according to claim 23, wherein said third control means includes adjusting means for adjusting, when outputting said image data to said recording medium, color tones carried by said image data for said individual color components stored in said memory means so that the image displayed under the control of said fourth control means is made to coincide with an image to be recorded on said recording medium.

25. An image processing system according to claim 24, wherein said adjusting means includes second look-up tables for converting said image data for said individual color components into predetermined data, and fourth control means for controlling said second look-up tables so that the conversion characteristics of said second look-up tables are made coincide with the conversion characteristics of said first look-up tables.

26. A control method for an image processing system arranged to read an original image and to produce an image output on a recording medium, said medium comprising the steps of:

color-sequentially reading out the original image as frame images for individual color components;

storing individual frame image information representing the frame images, read in said reading step, in a memory;

transferring the individual frame image information from the memory to a display frame by frame, by direct memory access;

synthesizing an image by superimposing a newly transferred frame image on a present displayed image; and updating the presently displayed image by the synthesized image each time one frame image is transferred and superimposed on the presently displayed image, wherein the storing operation of storing frame image information for a color component in the memory and the access operation of making access to frame image information for another color component by the direct memory access are performed in parallel.

27. A method according to claim 26, further comprising the steps of:

transmitting the image stored in the memory to a destination system in a frame-sequential manner; and storing the images received from the destination system in the frame-sequential manner in the memory.

28. A method according to claim 26, wherein said displaying step includes providing a signal-color display until image information on all the color components is prepared.

29. A method according to claim 26, wherein said transferring step includes the step of enlarging/reducing the image size of the images to be transferred.

30. A control method for an image processing system arranged to read an original image and to produce an image output on a display unit, said method comprising the steps of:

sequentially reading out the original image as frame images for individual color components;

writing the frame images read in said reading step to a memory in a frame-sequential manner over a first bus;

transferring the frame images from the memory to the display frame by frame over a second bus by direct memory access, while said writing step is sequentially writing the read frame images to the memory;

synthesizing an image by superimposing a newly transferred frame image on a presently displayed image; and updating the presently displayed image by the synthesized image each time one frame image is transferred and superimposed on the presently display image.

31. A method according to claim 30, wherein said reading step includes reading the original image as images of individual color components, the memory including independent image memories for storing the images of the individual color components.

32. A method according to claim 31, wherein said writing step includes writing the image data on a particular color component read in said reading step to a corresponding image memory in the memory, said transferring step including executing the direct memory access to transfer to the display the image data on the particular color component which has been written in said writing step.

33. A method according to claim 32, wherein said displaying step includes providing a signal-color display until image information on all the color components is prepared.

34. A method according to claim 30, wherein said transferring step includes enlarging/reducing the image size of the images.

35. A method according to claim 34, wherein said enlarging/reducing step includes enlarging/reducing the size of the image data stored in the memory on the basis of the magnification-alteration information, and further comprising the step of outputting enlarged/reduced image data to a recording medium.

36. A method according to claim 30, wherein the display comprises display memories for storing image data on the individual control components, and look-up tables for converting the image data on the individual control components read from the respective display memories into predetermined data values, respectively, and wherein said displaying step includes providing a color image on the basis of the individual color component data converted by the look-up tables.

37. A method according to claim 36, further comprising the step of changing the conversion characteristics of the respective look-up tables of the display in accordance with an instruction from an operator.

38. A method according to claim 37, further comprising the steps of adjusting the color tone of the image data stored in the memory on the basis of the information provided in said changing step, and outputting the image data, the color tone of which has been adjusted in said adjusting step, to a recording medium.

39. A control method for an image processing system capable of transmitting image information to a destination apparatus, reading out an original image, storing read image information in a memory, and displaying an image on a display screen of a display, said method comprising the steps of:

first enlarging/reducing of the image size of the image information stored in the memory according to the size of the original image;

outputting the enlarged/reduced image to the display;

displaying a desired portion of a reference image at a desired magnification, the reference image being an image displayed in said outputting step; and performing a second enlarging/reducing, of the image size of the image information stored in the memory at the magnification of said first enlarging/reducing step; and transmitting the image information enlarged/reduced in said second enlarging/reducing step, to the destination apparatus.

40. A method according to claim 39, wherein said first enlarging/reducing step includes enlarging/reducing the size of an image to display the whole read image on the display screen at a time.

41. A method according to claim 39, wherein the display comprises display memories for storing image data for individual color components, and first look-up tables for converting the image data for the color components read from the respective display memories into predetermined data values, and wherein said displaying step includes providing display on the display screen on the basis of the image data for individual color components converted by the respective look-up tables.

42. A image method according to claim 41, further comprising the step of changing the conversion characteristics of the respective first look-up tables of the display in accordance with an operator's command.

43. A method according to claim 42, wherein said transmitting step includes the steps of adjusting and transmitting color tones, carried by the image data for the individual color components stored in the memory, so that the image displayed under the control of said changing step is made to coincide with the image to be transmitted to the destination apparatus.

44. A method according to claim 43, wherein the image processing system further comprises second look-up tables for converting the image data for the individual color components into predetermined data, and wherein said adjusting step includes a step of controlling the second look-up tables so that conversion characteristics of the second converting tables are made to coincide with the conversion characteristics of the first look-up tables.

45. A control method for an image processing system capable of receiving image information from a destination apparatus, storing received image information in a memory, displaying an image on a display screen of a display, and printing out the image information to a recording medium, said method comprising the steps of:

first enlarging/reducing of the image size of the image information stored in the memory according to the size of the original image;

outputting the enlarged/reduced image to the display;

displaying a desired portion of a reference image at a desired magnification, the reference image being an image displayed under the control of said first enlarging/reducing step;

performing a second enlarging/reducing of the image size of the image information stored in the memory at the magnification of the image displayed in said displaying step; and printing out the image enlarged/reduced in said second enlarging/reducing step to the recording medium.

46. A method according to claim 45, wherein the first enlarging/reducing step includes enlarging/reducing the size of an image to display the whole read image on the display screen at a time.

47. A method according to claim 45, wherein the display comprises display memories for storing image data for individual color components, and first look-up tables for converting the image data for said color components read from the respective display memories into predetermined data values, and wherein said displaying step includes providing display on the display screen on the basis of the image data for individual color components converted by the respective first look-up tables.

48. A method according to claim 47, further comprising the step of changing the conversion characteristics of the respective look-up tables of the display in accordance with an operator's command.

49. A method according to claim 48, wherein said second enlarging/reducing step includes the step of adjusting, when outputting the image to the recording medium, color tones carried by the image data for the individual color components stored in the memory, so that the image displayed under the control of said changing step is made to coincide with said image to be recorded on the recording medium.

50. A method according to claim 49, wherein the image processing system further comprises second look-up tables for converting the image data for the individual color components into predetermined data, and wherein said adjusting step includes the step of controlling the second look-up tables so that conversion characteristics of the second converting tables are made to coincide with the conversion characteristics of the first look-up tables.

* * * * *

UNITED STATES PATENT AND TRADEMARK OFFICE
CERTIFICATE OF CORRECTION

PATENT NO. : 5,493,415

DATED : February 20, 1996

INVENTOR(S) : Yoshinobu Mita et al.

It is certified that error appears in the above-identified patent and that said Letters Patent is hereby corrected as shown below:

On the title page: Item [54]

"IMGAE" should read --IMAGE".

DRAWING SHEET 4

Fig. 3, "TILMER" should read --TIMER--.

COLUMN 1

Line 1, IMGAE" should read --IMAGE--.
Line 18, "succeed" should read --succeeded--.
Line 43, "has" should read --have--.

COLUMN 3

Line 48, "image image" should read --image--.

COLUMN 4

Line 31, "display" should read --displaying--.

UNITED STATES PATENT AND TRADEMARK OFFICE
CERTIFICATE OF CORRECTION

PATENT NO. : 5,493,415

DATED : February 20, 1996

INVENTOR(S) : Yoshinobu Mita et al.

Page 2 of 6

It is certified that error appears in the above-identified patent and that said Letters Patent is hereby corrected as shown below:

COLUMN 7

Line 2, "713M," should read --731M,-- and "713Bk" should read --731Bk--.
    Line 6, "sleeves 731Y-713Bk," should read --sleeves 731Y-731Bk,--.

COLUMN 8

Line 41, "reference" should read --reference to--.
    Line 45, ", reach" should be deleted.

COLUMN 9

Line 4, "feet" should read --feed--.
    Line 31, "pages memory" should read --page memories--.
    Line 55, "AND" should read --and--.
    Line 58, "a" should read --an--.

UNITED STATES PATENT AND TRADEMARK OFFICE
CERTIFICATE OF CORRECTION

PATENT NO. : 5,493,415

DATED : February 20, 1996

INVENTOR(S) : Yoshinobu Mita et al.

It is certified that error appears in the above-identified patent and that said Letters Patent is hereby corrected as shown below:

COLUMN 12

Line 8, "pages memory" should read --page memories--.
    Line 11, "Each of the pages memory PRM 102, PMG"
      should be deleted.
    Lines 12 and 13, Lines 12 and 13 should be deleted.
    Line 14, "board number of itself." should be
      deleted.
    Line 33, "is" should read --has--.
    Line 49, "reduce" should read --reduces--.

COLUMN 13

Line 8, "be" should be deleted.

COLUMN 14

Line 59, "a" should read --an--.

UNITED STATES PATENT AND TRADEMARK OFFICE
CERTIFICATE OF CORRECTION

PATENT NO. : 5,493,415

DATED : February 20, 1996

INVENTOR(S) : Yoshinobu Mita et al.

It is certified that error appears in the above-identified patent and that said Letters Patent is hereby corrected as shown below:

COLUMN 15

Line 33, "R, B" should read --R, G--.

COLUMN 20

Line 2, "synchronizig" should read --sychronizing--.
Line 37, "the the" should read --the--.

COLUMN 23

Line 35, "means; and" should read --means;--.
Line 37, "means;" should read --means; and--.
Line 45, "means, wherein" should read --means, ¶ wherein--.

UNITED STATES PATENT AND TRADEMARK OFFICE
CERTIFICATE OF CORRECTION

PATENT NO.   :  5,493,415

DATED        :  February 20, 1996

INVENTOR(S)  :  Yoshinobu Mita et al.

It is certified that error appears in the above-identified patent and that said Letters Patent is hereby corrected as shown below:

COLUMN 24

Line 13, "comprising;" should read --comprises:--.
    Line 18, "comprising" should read --comprises--.
    Line 19, "color" should read --a color--.
    Line 61, "to alter" should read --alters--.

COLUMN 25

Line 15, "made" should read --made to--.
    Line 23, "made" should read --made to--.
    Line 49, "to alter" should read --alters--.

COLUMN 26

Line 12, "made" should read --made to--.
    Line 67, "display" should read --displayed--.

UNITED STATES PATENT AND TRADEMARK OFFICE
CERTIFICATE OF CORRECTION

PATENT NO. : 5,493,415

DATED : February 20, 1996

INVENTOR(S) : Yoshinobu Mita et al.

It is certified that error appears in the above-identified patent and that said Letters Patent is hereby corrected as shown below:

COLUMN 27

Line 56, "and" should be deleted.
    Line 57, "enlarging/reducing," should read
      --enlarging/reducing--.

COLUMN 28

Line 6, "providing" should read --providing a--.
    Line 9, "image" should be deleted.

Signed and Sealed this

Fifteenth Day of October, 1996

Attest:

BRUCE LEHMAN

*Attesting Officer*       *Commissioner of Patents and Trademarks*

UNITED STATES PATENT AND TRADEMARK OFFICE
CERTIFICATE OF CORRECTION

PATENT NO. : 5,493,415
DATED : February 20, 1996
INVENTOR(S) : Yoshinobu Mita et al.

Page 1 of 6

It is certified that error appears in the above-indentified patent and that said Letters Patent is hereby corrected as shown below:

TITLE PAGE, ITEM [54]:

"IMGAE" should read --IMAGE".

DRAWING SHEET 4

Fig. 3, "TILMER" should read --TIMER--.

COLUMN 1

Line 1, IMGAE" should read --IMAGE--.
Line 18, "succeed" should read --succeeded--.
Line 43, "has" should read --have--.

COLUMN 3

Line 48, "image image" should read --image--.

COLUMN 4

Line 31, "display" should read --displaying--.

UNITED STATES PATENT AND TRADEMARK OFFICE
CERTIFICATE OF CORRECTION

PATENT NO. : 5,493,415
DATED : February 20, 1996
INVENTOR(S) : Yoshinobu Mita et al.

It is certified that error appears in the above-indentified patent and that said Letters Patent is hereby corrected as shown below:

COLUMN 7

Line 2, "713M," should read --731M,-- and "713Bk" should read --731Bk--.
Line 6, "sleeves 731Y-713Bk," should read --sleeves 731Y-731Bk,--.

COLUMN 8

Line 41, "reference" should read --reference to--.
Line 45, ", reach" should be deleted.

COLUMN 9

Line 4, "feet" should read --feed--.
Line 31, "pages memory" should read --page memories--.
Line 55, "AND" should read --and--.
Line 58, "a" should read --an--.

UNITED STATES PATENT AND TRADEMARK OFFICE
CERTIFICATE OF CORRECTION

PATENT NO. : 5,493,415

DATED : February 20, 1996

INVENTOR(S) : Yoshinobu Mita et al.

Page 3 of 6

It is certified that error appears in the above-indentified patent and that said Letters Patent is hereby corrected as shown below:

COLUMN 12

Line 8, "pages memory" should read --page memories--.
    Line 11, "Each of the pages memory PRM 102, PMG"
       should be deleted.
    Lines 12 and 13, Lines 12 and 13 should be deleted.
    Line 14, "board number of itself." should be
       deleted.
    Line 33, "is" should read --has--.
    Line 49, "reduce" should read --reduces--.

COLUMN 13

Line 8, "be" should be deleted.

COLUMN 14

Line 59, "a" should read --an--.

UNITED STATES PATENT AND TRADEMARK OFFICE
CERTIFICATE OF CORRECTION

PATENT NO. : 5,493,415

DATED : February 20, 1996

INVENTOR(S) : Yoshinobu Mita et al.

It is certified that error appears in the above-indentified patent and that said Letters Patent is hereby corrected as shown below:

COLUMN 15

Line 33, "R, B" should read --R, G--.

COLUMN 20

Line 2, "synchronizig" should read --sychronizing--.
Line 37, "the the" should read --the--.

COLUMN 23

Line 35, "means; and" should read --means;--.
Line 37, "means;" should read --means; and--.
Line 45, "means, wherein" should read --means, ¶ wherein--.

UNITED STATES PATENT AND TRADEMARK OFFICE
CERTIFICATE OF CORRECTION

PATENT NO. : 5,493,415
DATED : February 20, 1996
INVENTOR(S) : Yoshinobu Mita et al.

It is certified that error appears in the above-indentified patent and that said Letters Patent is hereby corrected as shown below:

COLUMN 24

```
Line 13, "comprising;" should read --comprises:--.
Line 18, "comprising" should read --comprises--.
Line 19, "color" should read --a color--.
Line 61, "to alter" should read --alters--.
```

COLUMN 25

```
Line 15, "made" should read --made to--.
Line 23, "made" should read --made to--.
Line 49, "to alter" should read --alters--.
```

COLUMN 26

```
Line 12, "made" should read --made to--.
Line 67, "display" should read --displayed--.
```

UNITED STATES PATENT AND TRADEMARK OFFICE
CERTIFICATE OF CORRECTION

PATENT NO. : 5,493,415
DATED : February 20, 1996
INVENTOR(S) : Yoshinobu Mita et al.

It is certified that error appears in the above-indentified patent and that said Letters Patent is hereby corrected as shown below:

COLUMN 27

```
Line 56, "and" should be deleted.
Line 57, "enlarging/reducing," should read
    --enlarging/reducing--.
```

COLUMN 28

```
Line 6, "providing" should read --providing a--.
Line 9, "image" should be deleted.
```

Signed and Sealed this

Twenty-ninth Day of October 1996

Attest:

BRUCE LEHMAN

Attesting Officer    Commissioner of Patents and Trademarks